United States Patent [19]

Jenkins et al.

[11] 4,271,440
[45] Jun. 2, 1981

[54] AUTOMATIC TAPE CARTRIDGE HANDLING SYSTEM

[75] Inventors: John P. Jenkins, Towanda; Rodney M. Sabick, Normal; William W. Kidd, Bloomington, all of Ill.

[73] Assignee: International Tapetronics Corporation, Bloomington, Ill.

[21] Appl. No.: 27,800

[22] Filed: Apr. 6, 1979

[51] Int. Cl.³ .................... G11B 15/68; G11B 23/04
[52] U.S. Cl. ........................ 360/92; 360/69; 360/72.1
[58] Field of Search ............ 360/92, 91, 71–72, 360/69, 74, 88; 242/181

[56] References Cited

U.S. PATENT DOCUMENTS

| | | | |
|---|---|---|---|
| 3,453,397 | 7/1969 | Miller et al. | 360/92 |
| 3,484,055 | 12/1969 | Raine | 360/92 X |
| 3,938,190 | 2/1976 | Semmlow et al. | 360/92 X |
| 4,063,294 | 12/1977 | Burkhart | 360/92 |
| 4,099,209 | 7/1978 | Sander et al. | 360/92 |
| 4,145,724 | 3/1979 | Medding et al. | 360/92 |

FOREIGN PATENT DOCUMENTS

| | | | |
|---|---|---|---|
| 700213 | 12/1964 | Canada | 360/92 |
| 1299127 | 7/1969 | Fed. Rep. of Germany | 360/92 |

*Primary Examiner*—John H. Wolff
*Attorney, Agent, or Firm*—McCaleb, Lucas & Brugman

[57] ABSTRACT

A fully automatic microcomputer-controlled tape cartridge handling system. As illustrated here, it has a high degree of redundancy providing maximum reliability in radio broadcasting service and other applications. It comprises two storage drums, four stacks of playback transducers, two cartridge transfer mechanisms, a loading chute, and an unloading chute. Each drum has a cylindrical configuration with 512 cartridge storage compartments arranged in 16 vertical columns around its circumference and 32 horizontal rows along its axis. Two transducer stacks and one transfer mechanism are on each side of the pair of drums. Each transfer mechanism is positioned adjacent both drums and positioned adjacent two of the transducer stacks, one of the transfer mechanisms also being adjacent the loading and unloading chutes. Each transfer mechanism has a cage which is selectively rotatably swingable to positions aligned with either drum or either adjacent transducer. Additionally, the transfer mechanism which is adjacent the loading and unloading chutes is selectively swingable to a position aligned with them. A cartridge holding platform on the cage is vertically moveable to various valid, discrete operative positions. The drums are rotatable, the transfer mechanisms are swingable, and the cartridge holding platforms are moveable by motors controlled by a microcomputer which reads and identifies each cartridge as it enters the system and monitors it at every position as it moves through the system. The system is fool-proof and vandal-free because it is completely sealed. Cartridges can be inserted only through the loading chute, and removed only from the unloading chute, through automatic sequences controlled completely by the microcomputer operating from a predetermined program.

39 Claims, 36 Drawing Figures

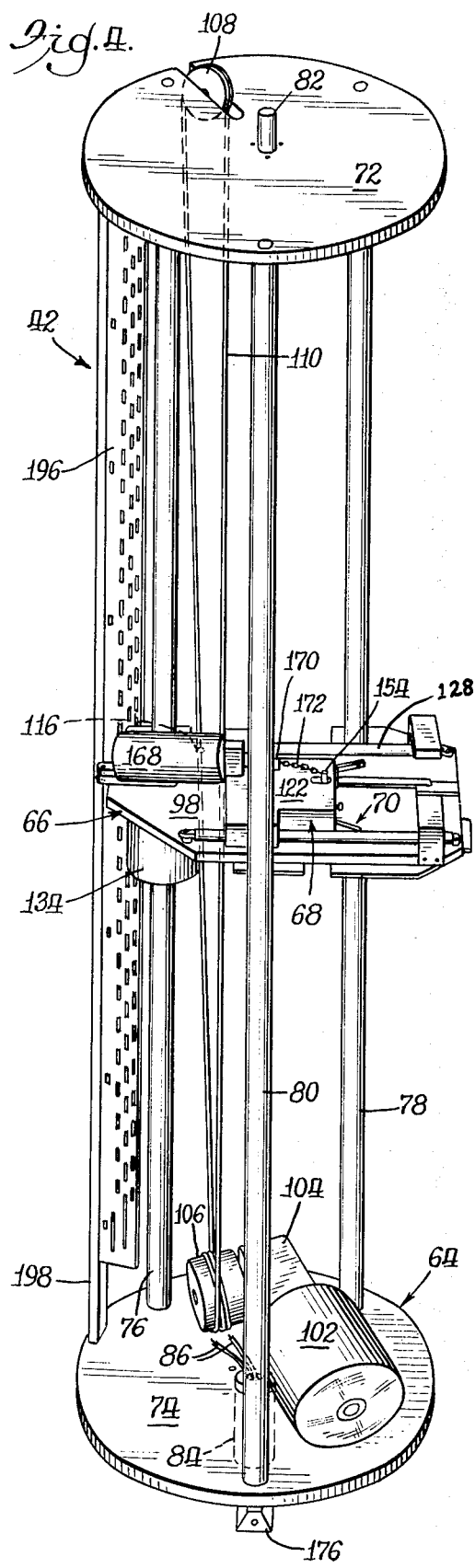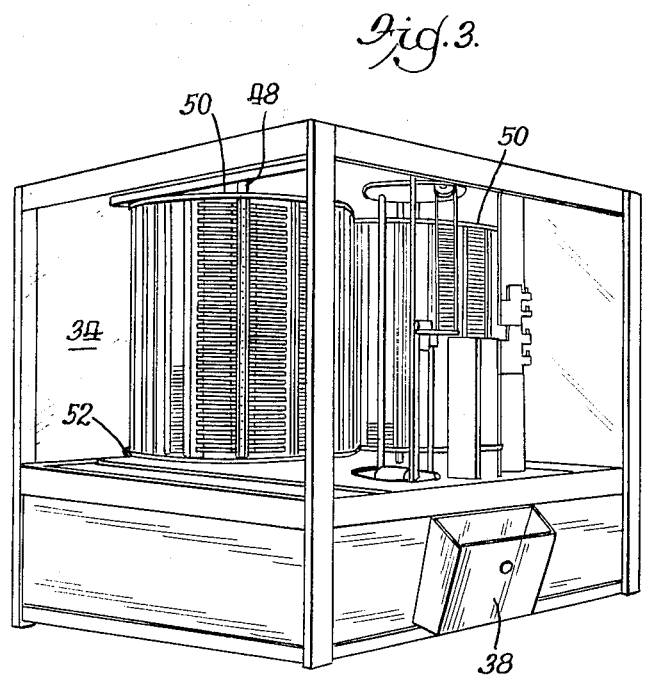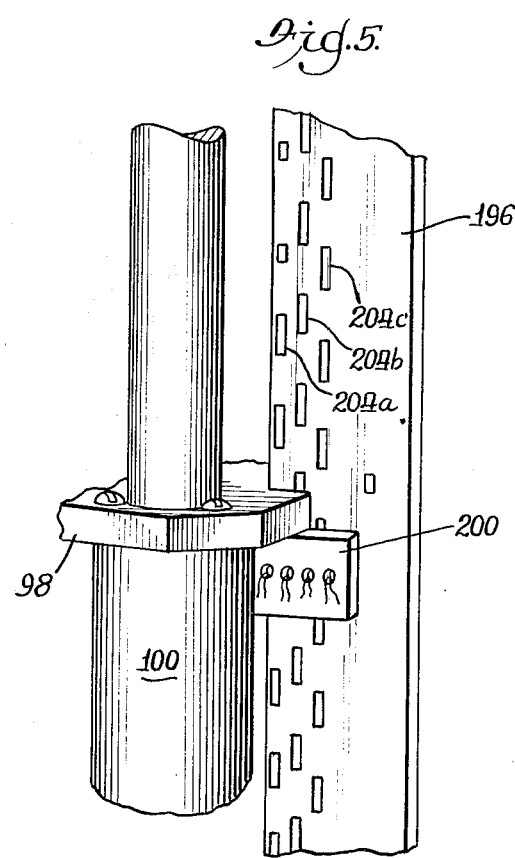

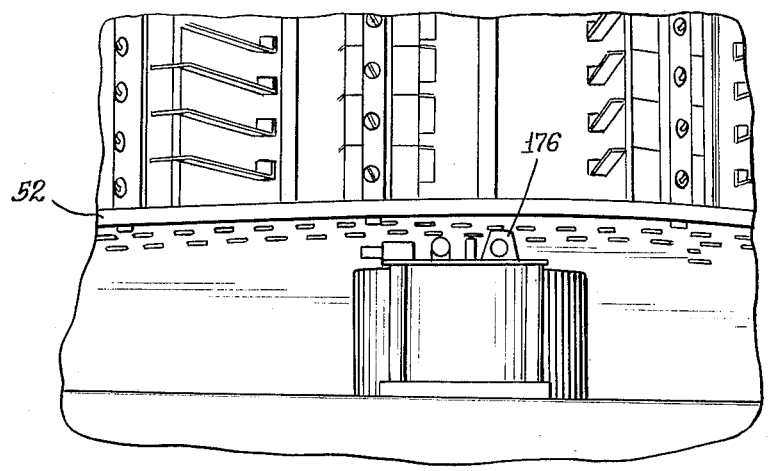
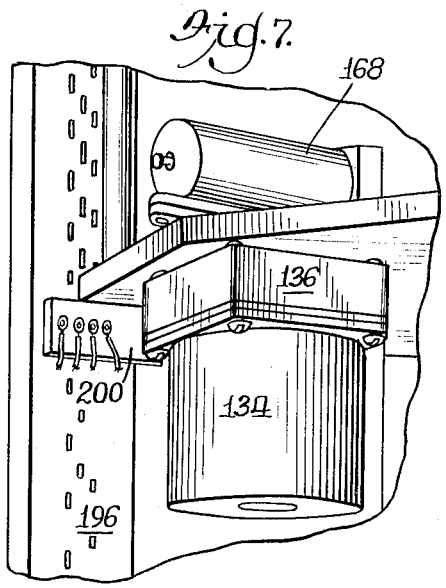
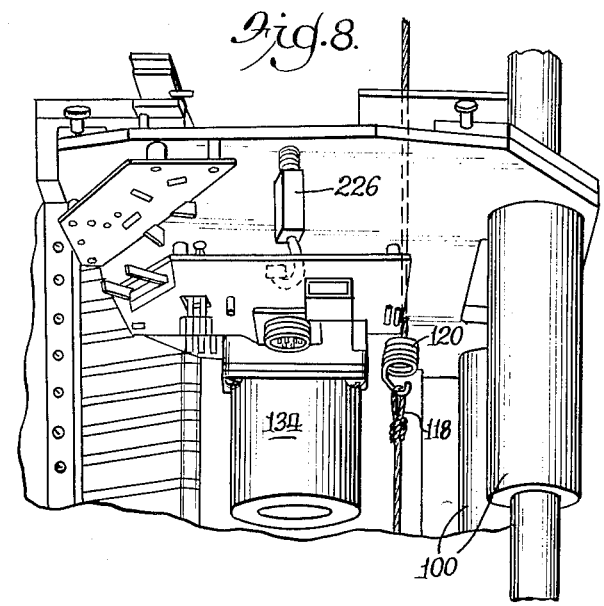
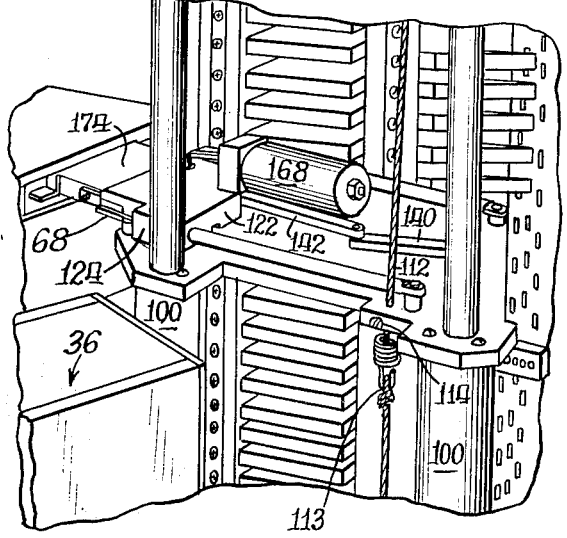
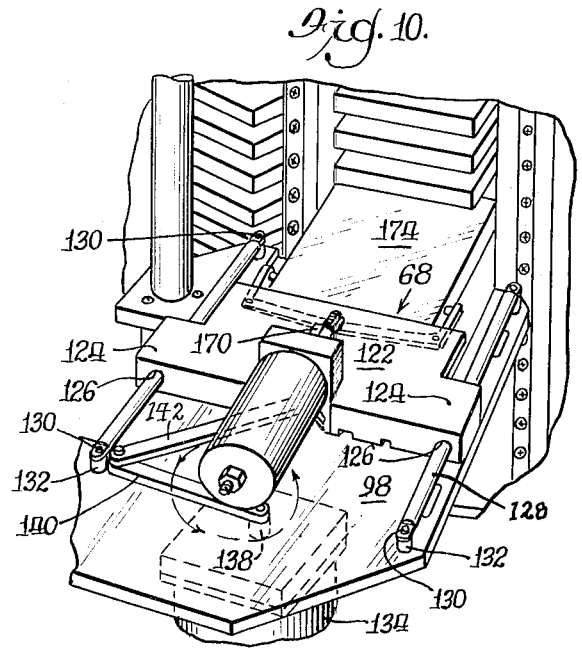

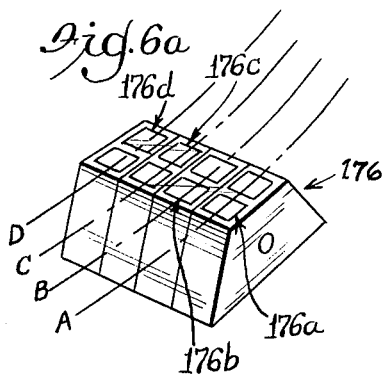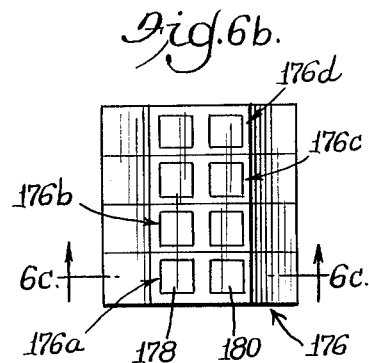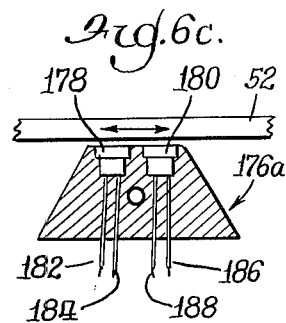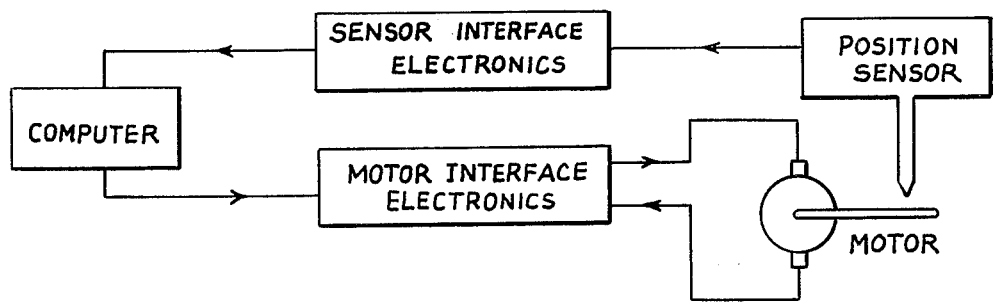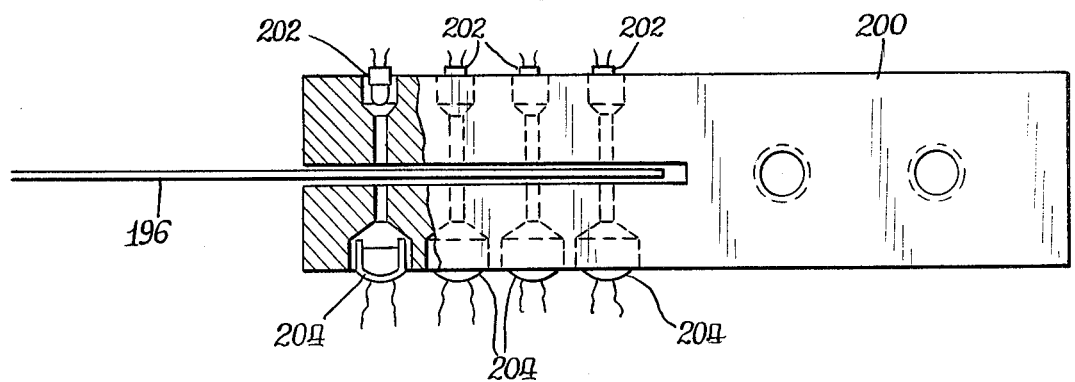

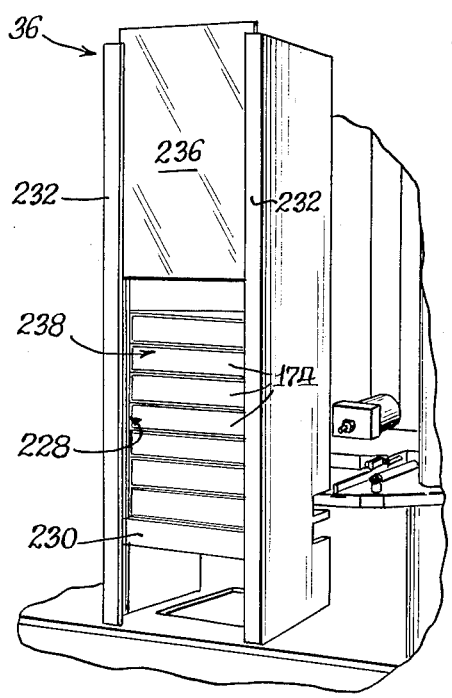
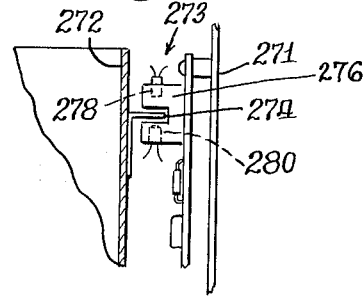
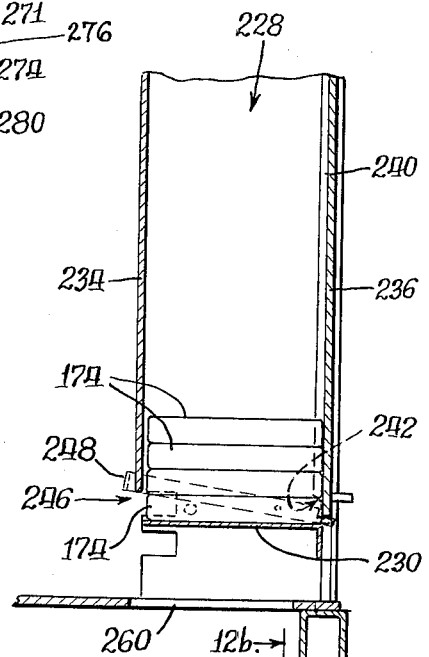
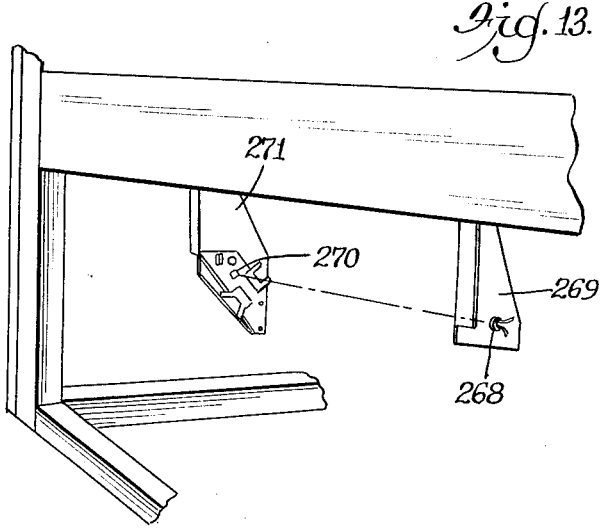
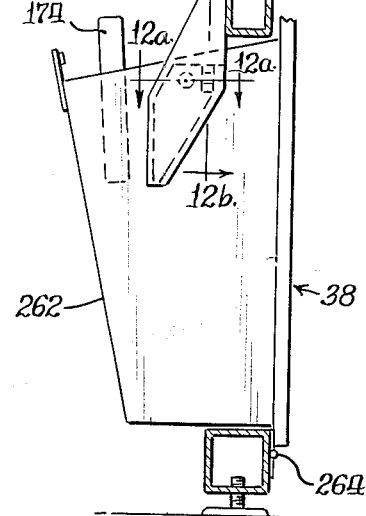
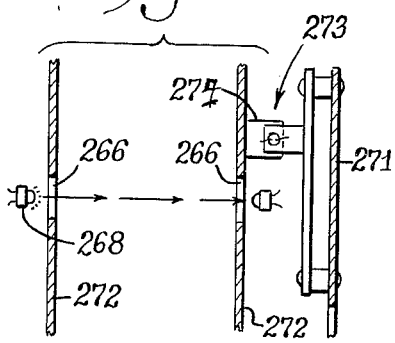
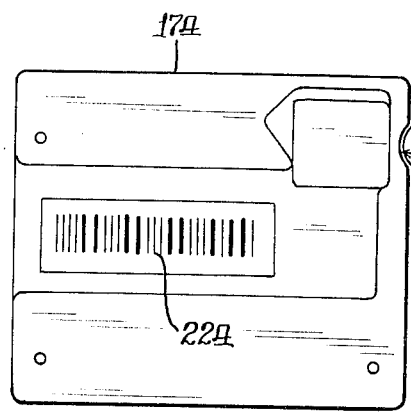

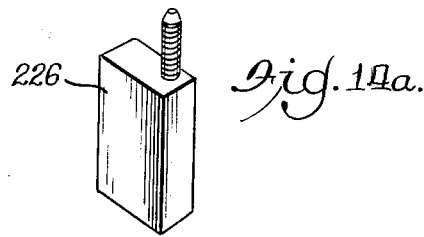
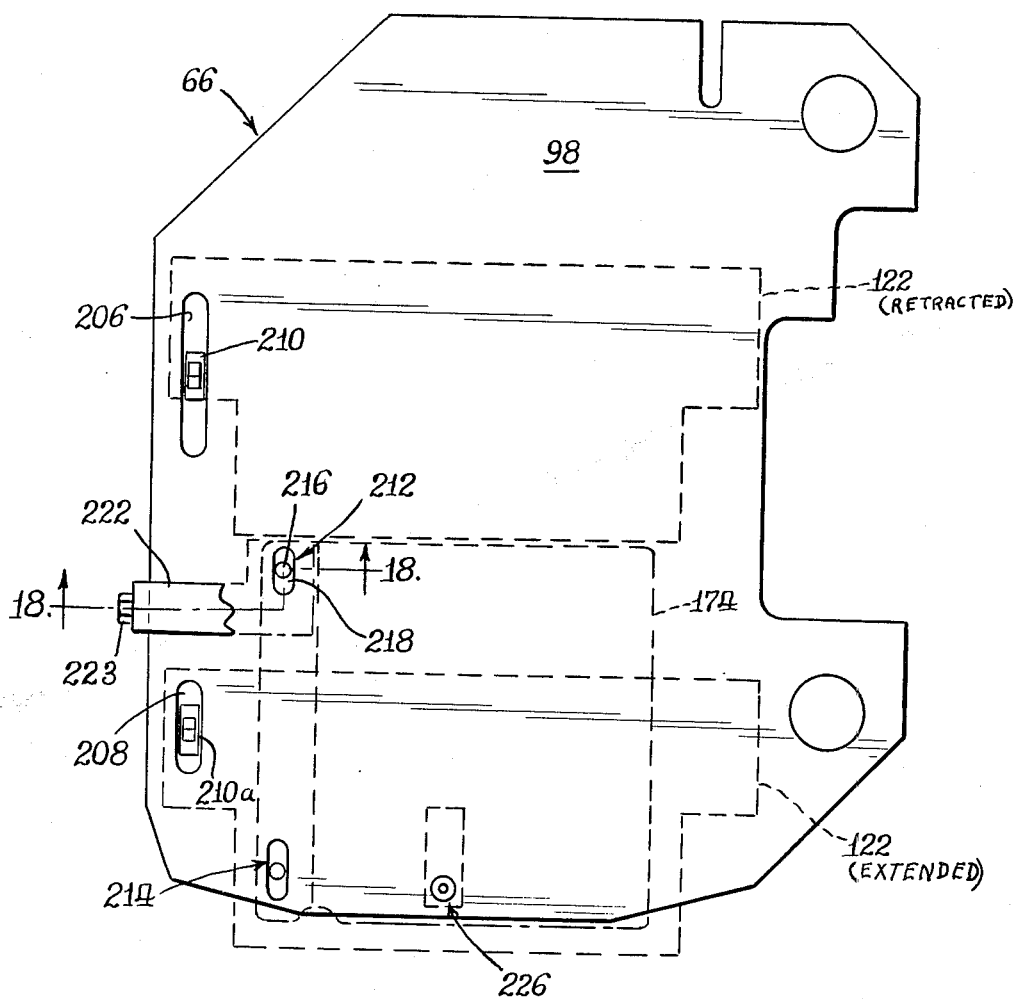
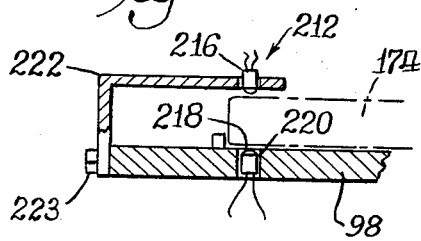
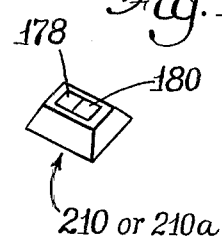

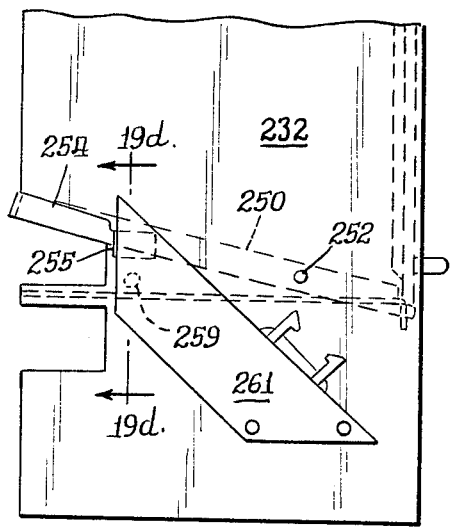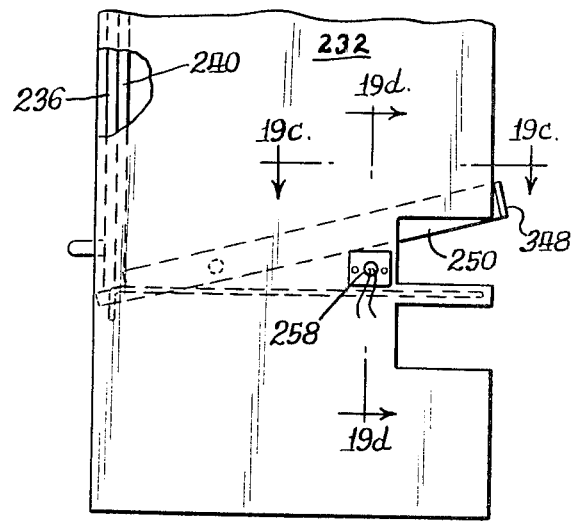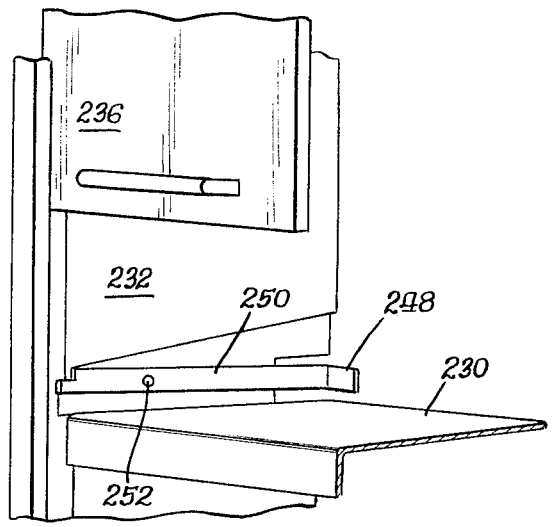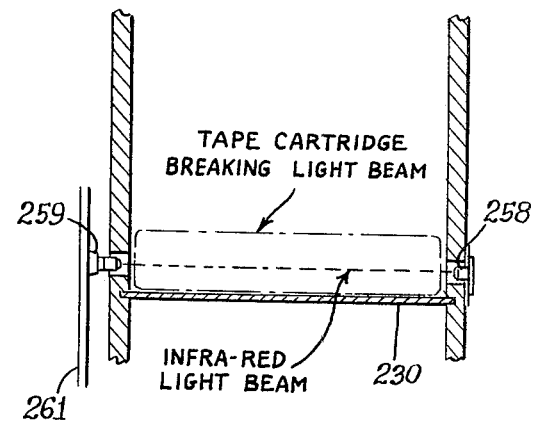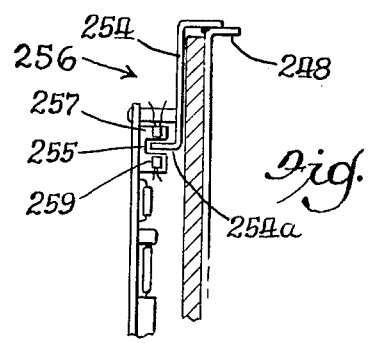

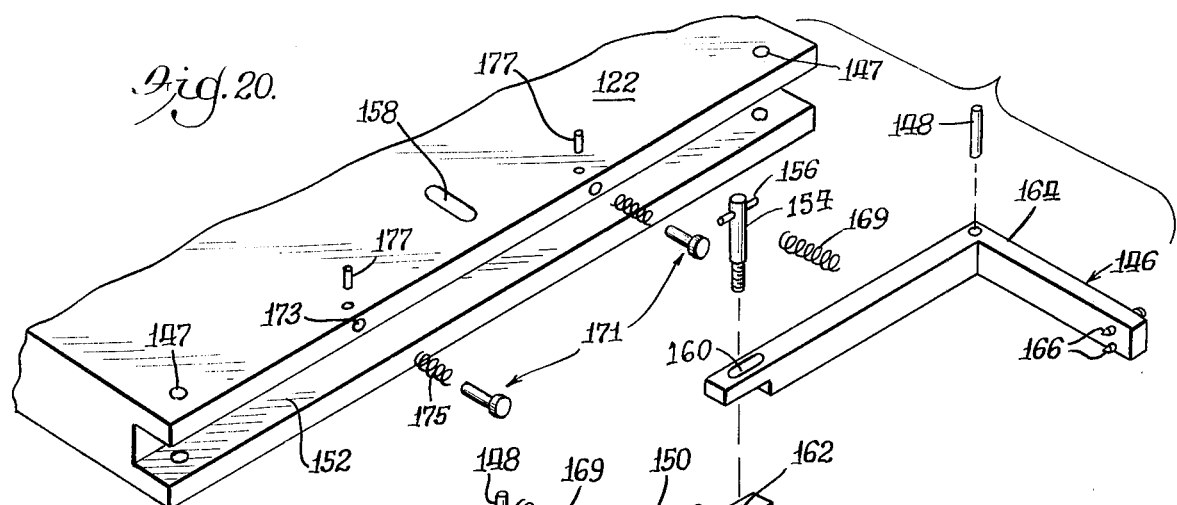
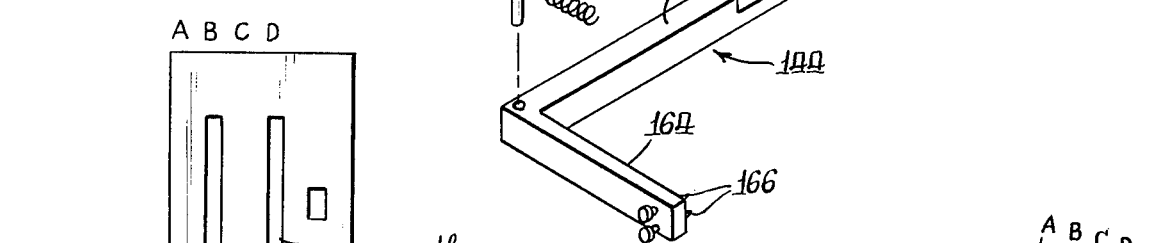
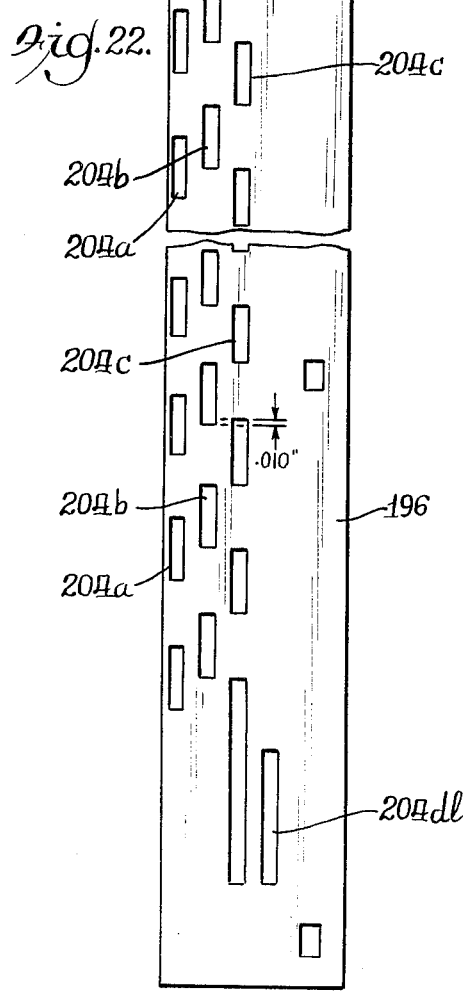
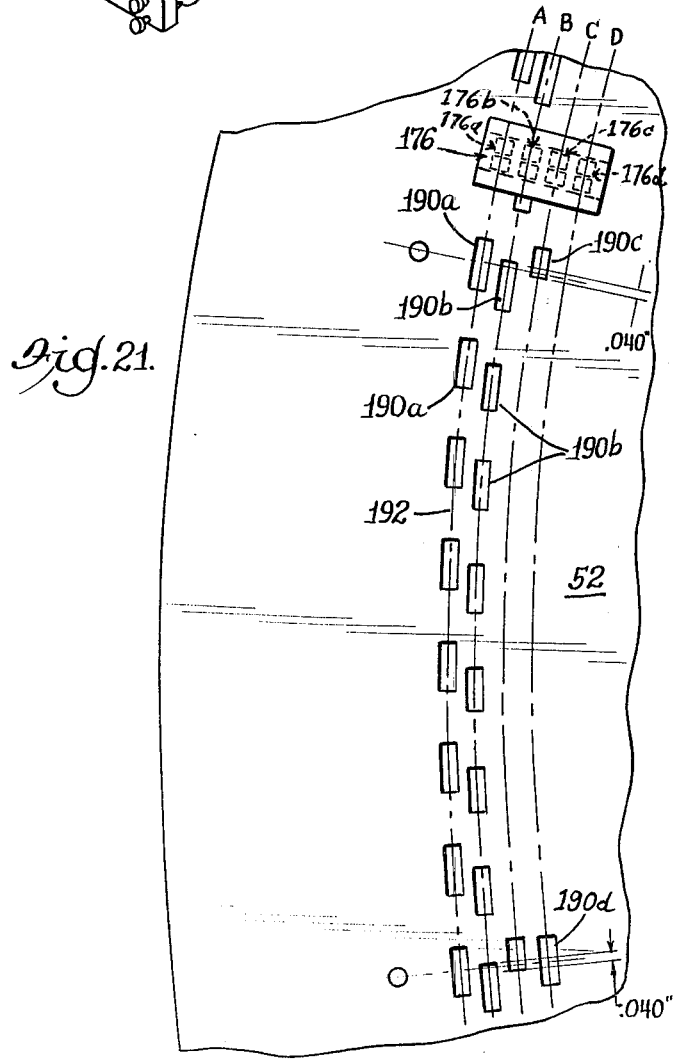

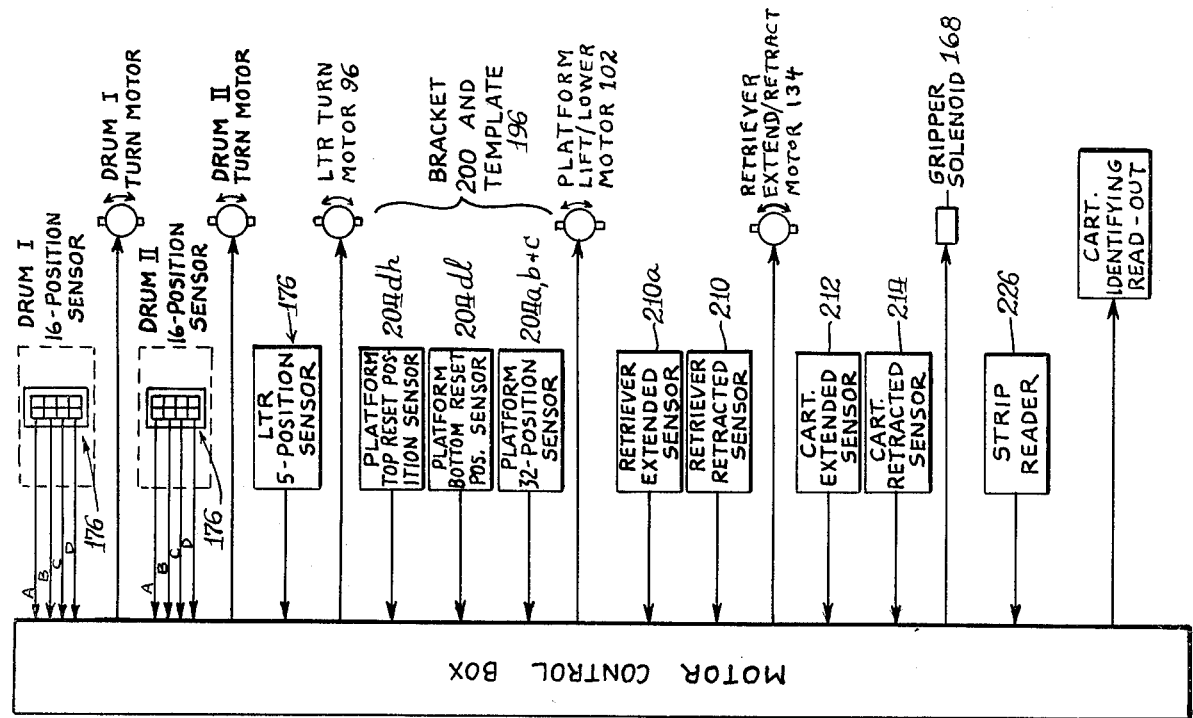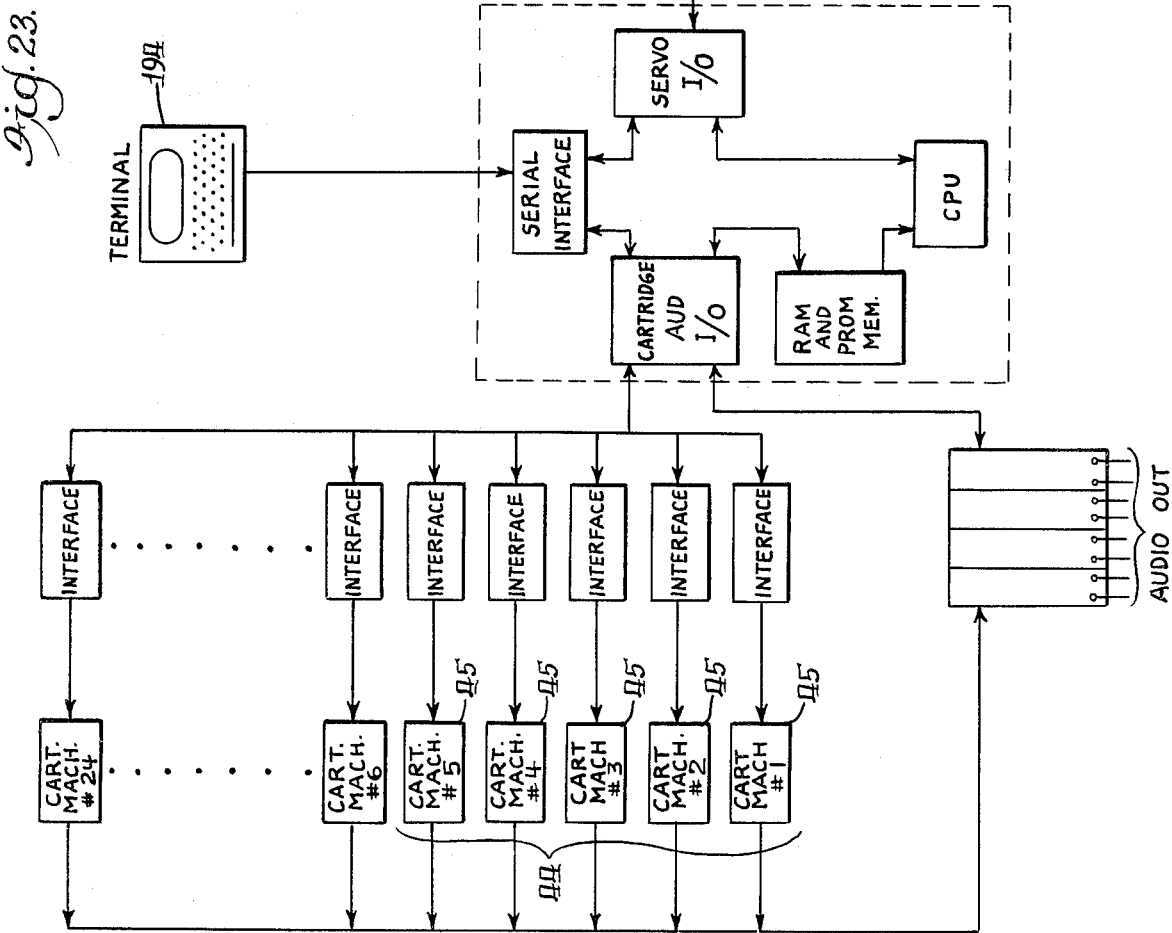
Fig. 23.

AUTOMATIC TAPE CARTRIDGE HANDLING SYSTEM

BACKGROUND OF THE INVENTION

Two general types of automatic tape cartridge playing machines have been used in the radio broadcasting industry prior to this invention. These are random access machines and instant access machines.

The random access type moved cartridges back and forth between a storage unit and a single playback unit. This was made in two configurations.

The first random access configuration was a carousel machine. Typically, it had a drum storing 24 cartridges. The drum turned until the selected cartridge was located in front of the playback unit. The cartridge was then inserted into the playback unit in readiness for playing. After playing, it was returned to the drum which then rotated to place the next selected cartridge in front of the playback unit.

The second random access configuration, no longer made, stored about 55 cartridges in a vertical stack. A playback unit was mounted behind the stack on an elevatable platform. This was moveable up and down until it stopped at a selected cartridge. The cartridge was inserted into the playback unit and played after which it was returned to the stack and the unit was then moved to the next selected cartridge.

The problem of using random access machines in broadcasting is that a single machine cannot play cartridges one immediately after the other. In order to partially overcome this problem, multiple random access machines can be used. However it is very difficult to program multiple random access machines with the limitation that one cartridge cannot be played immediately after another in any one playback unit.

It is possible to solve this problem by putting duplicate cartridges in two different machines. Then one is never faced with the back-to-back playout of one machine. The cost of recording duplicate program material makes this very expensive.

The other type of machine, the instant access machine, comprises, in effect, multiple playback units, each with a cartridge ready to be played instantly on command. A typical machine consists of 48 cartridge-supporting trays, 48 heads, 48 pinch rollers and 48 amplifiers. This overcomes the above described limitation of the random access machine but is very costly. The cost of a single 48-tray instant access machine is more than 10,000, yet it would be woefully inadequate to handle the large volume of cartridges used in modern broadcasting. Cost and service problems are major handicaps.

In short, prior to the present invention, no practical automatic tape cartridge playing machine or system has been available for modern broadcasting. Neither the conventional random access machine nor the instant access machine can function suitably except with modifications and duplications of components which would make it prohibitively expensive both with respect to original investment and cost of maintenance.

BRIEF SUMMARY OF THE INVENTION

The present invention is, in effect, a pseudo instant access machine. The basic concept consists of at least one cartridge storage drum each containing about 500 cartridges, and at least one stack or bank consisting typically of five playback machines. There is at least one mechanical transfer mechanism sometimes herein called the LTR ("Lift-Turn-Retrieve") which is capable of taking any cartridge from the drum and placing it in any one of the playback machines. Once the cartridges have been played, the transfer mechanism replaces them in the drum or unloads them from the system. The system overcomes the limitations of the random access machine by reason of the fact that, while it is playing a first cartridge in one playback machine, it can transfer a second cartridge (the next to be played) from the drum to another playback machine and have it ready for play instantly when the first cartridge concludes. Further, while the first or second cartridge is playing, it can transfer a third cartridge to a third playback machine and have it ready for play, and transfer fourth and fifth cartridges in a similar fashion. By the time the first cartridge has played and completed, the next one will start, and so forth. The system can transfer the first cartridge, after play, back to storage in the drum, select a sixth cartridge, locate it in a now available playback machine, and always have a series of cartridges loaded in preparation for play in sequence called for by a predetermined program or by the operator who can change the program at will.

Furthermore, the system is sufficiently flexible that it does not necessarily load cartridges in the playback machines in the sequence of Machine 1, Machine 2, etc. It will select cartridges in the order that they are to be played in any available machine, hold in memory which cartridges are loaded in which machines, and play them in the order required. Furthermore, the memory associated with the microcomputer will return cartridges from any playback machine to its original storage location in the drum, or to another storage location in the drum, and retain in constantly updated memory the location of every cartridge at all times.

Access time is important in radio broadcasting operation to stay ahead of demand, depending upon the length of the individual messages to be played and the number of playback machines available to be loaded. If the messages being stored within the system are very short in duration, and thus the system would not have time to insert and replace cartridges at a rapid enough rate to stay ahead of playback needs, it is so designed that additional playback machines can be added with as many as -or 18 playback machines being served by a single LTR transfer mechanism.

Depending on the degree of redundancy required by the system, and the cartridge capacity for the particular service application, two or more storage drums may be used with duplicate LTR transfer mechanisms, and up to five stacks of playback machines with as many as six individual machines in each stack. Multiple systems may be used in tandem for a very large broadcasting operation involving the regular use and storage of more than 8,000 individual tape cartridges.

The system is designed with an LTR transfer mechanism capable of selecting any cartridge and putting it in any one of two or more playback machines. In a system using two cartridge storage drums, a second LTR can be added as an option which mounts on one side of the pair of drums opposite the first LTR, and the second LTR can retrieve and load cartridges into two or more additional playback machines from the same two drums. This will provide redundant mechanics in case of failure without inhibiting the capability of playing any cartridge back-to-back with any other cartridge. Where two LTR units are so employed, the system would operate the two LTRs to equalize wear on the two mechanical assemblies while at the same time providing mechanical back-up. The control system would be programmed automatically to use one LTR if the other failed.

Previous attempts to substitute a very large cartridge library storage in a fully automated system, as a substitute for the random access machines and instant access machines described above, have involved a library storage of many hundreds of tape cartridges in a flat plane with cartridges stored in X-Y configurations. A transfer mechanism moved horizontally and vertically along the rows and columns to retrieve and replace cartridges. This had several disadvantages. It was complicated and expensive to incorporate any effective rendundancy into such a system, and it was far more difficult to operate and control receiprocating mechanisms than rotating mechanisms.

A general object of the present invention therefor is to provide a tape cartridge handling system capable of storing and playing very large numbers of cartridges, with the high degree of redundancy needed for large volume operations in commercial radio broadcasting service.

Another object is to provide such a system, within a sealed housing, to which human access is limited to placing cartridges in a loading chute and removing them from an unloading chute. Otherwise the system is internally fully machine- and computer-controlled, making it impossible for anyone to be injured by the mechanism, and it is fool-proof and vandal free. Further, no one can purposely or negligently put a cartridge in the loading chute backwards or upside down, or take a cartridge directly from a storage drum, or place a cartridge directly in a drum where the computer control cannot find it.

Another object is to automatically read indicia such as optical identification coding on the cartridge to identify it as it enters the system, so it can be monitored continuously to retain a memory of its position in the playback machines and storage drums.

GENERAL DESCRIPTION OF THE DRAWINGS

Other objects and advantages will be apparent from the drawings in which:

FIG. 3 is a front perspective view of either of the systems shown in FIGS. 1 and 2;

FIG. 4 is a perspective view of one of the LTR transfer mechanisms;

FIG. 5 is a fragmentary, enlarged view of FIG. 4 as seen from the back side of FIG. 4, showing part of the optical means for sensing the vertical position of the cartridge-supporting platform on one of the LTR units;

FIG. 6 is a partial perspective view of one of the cartridge storage drums showing part of the optical means for sensing the rotated position of the drum;

FIG. 6a is a perspective view of a four-element array of light sources and light sensors shown in FIG. 6;

FIG. 6b is a top plan view of FIG. 6a;

FIG. 6c is a cross sectional view of FIG. 6b on line 6c—6c;

FIG. 7 is a view similar to FIG. 5, as seen from the back side of FIG. 5;

FIG. 8 is a perspective view of the front underside of the platform on one of the LTR units;

FIG. 9 is a perspective view of the platform with the cartridge holding member in forward, extended position;

FIG. 10 is another perspective view of the platform showing a cartridge partly withdrawn from a storage compartment in a drum;

FIG. 11 is a fragmentary perspective view of the loading chute and the opening below it for the discharge chute;

FIG. 12 is a vertical cross-sectional view through FIG. 11 showing among other things a cartridge being discharged into the basket portion of the discharge chute;

Figure 15:
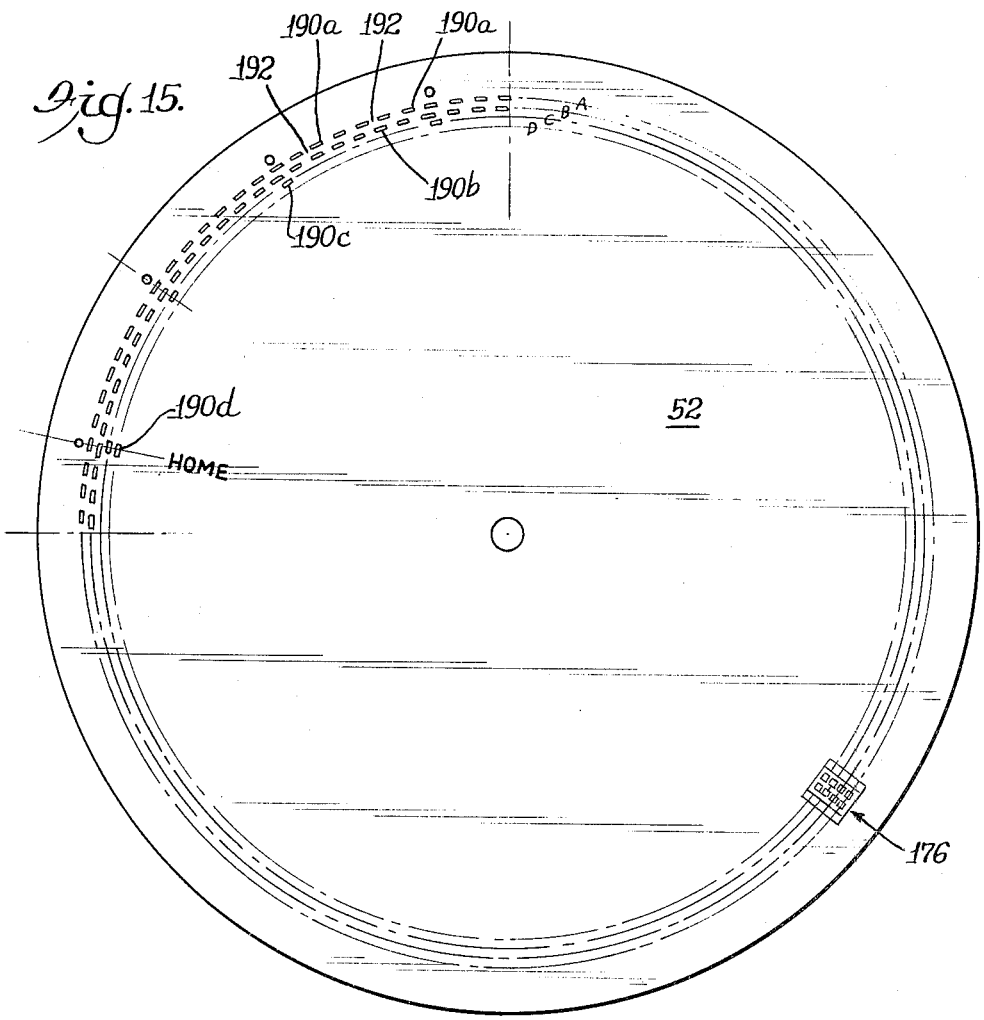
Figure 16:
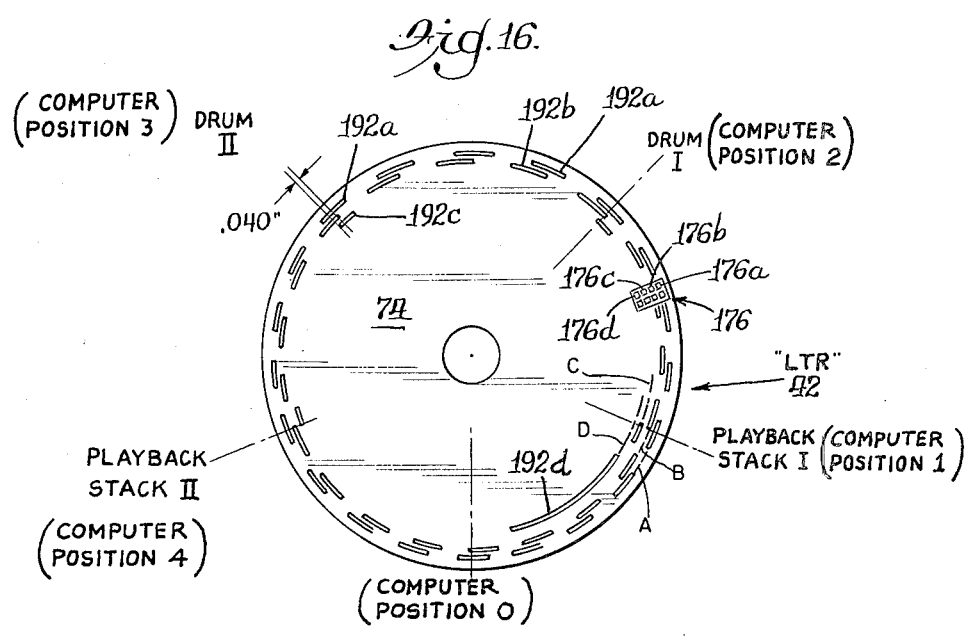

FIGS. 12a and 12b are cross-sectional views of FIG. 12 on lines 12a —12a and 12b —12b respectively;

FIG. 13 is a fragmentary perspective view of the frame showing part of the optical system for verifying that the discharge chute basket is closed and has available room for additional cartridges;

FIG. 14 is a bottom view of a typical cartridge showing one form of optical coding indicia;

FIG. 14a is a bar code reader;

FIG. 15 is a bottom view of one of the drums showing a series of reflective strips comprising part of the optical position-sensing means for it;

FIG. 16 is a bottom view of one of the LTR units showing a series of reflective strips forming part of the optical position-sensing system for it;

FIG. 17 is a plan view of the vertically moveable platform on the LTR transfer mechanism showing means for optically sensing the positions of the cartridge holder, and the cartridge, in retracted and extended positions;

FIG. 17a is one of the opto-reflective sensors shown in FIG. 17;

FIG. 18 is a fragmentary cross-section of FIG. 17 taken along the line 18—18;

FIGS. 19 and 19a are right and left side views respectively of the loading chute;

FIG. 19b is a fragmentary perspective view of the loading chute;

FIG. 19c is a fragmentary cross-section of FIG. 19 taken along line 19c—19c;

FIG. 19d is a fragmentary cross-section of FIG. 19 taken along line 19d—19d;

FIG. 20 is a fragmentary exploded view of the cartridge holder and gripper arms on the LTR unit platform;

FIG. 21 is a fragmentary enlarged view of FIG. 15;

FIG. 22 is an enlarged view of an apertured template shown more generally in some of the previous views of the LTR transfer mechanism;

FIG. 23 is a block diagram of the overall computer-controlled system;

FIG. 24 is a closed-loop control diagram of several of the computer-monitored, power-operated mechanisms; and FIG. 25 is an enlarged cross-sectional view of the lift position template and light and sensor array associated with it.

Like parts are referred to by like reference characters throughout the drawings.

Figure 1:
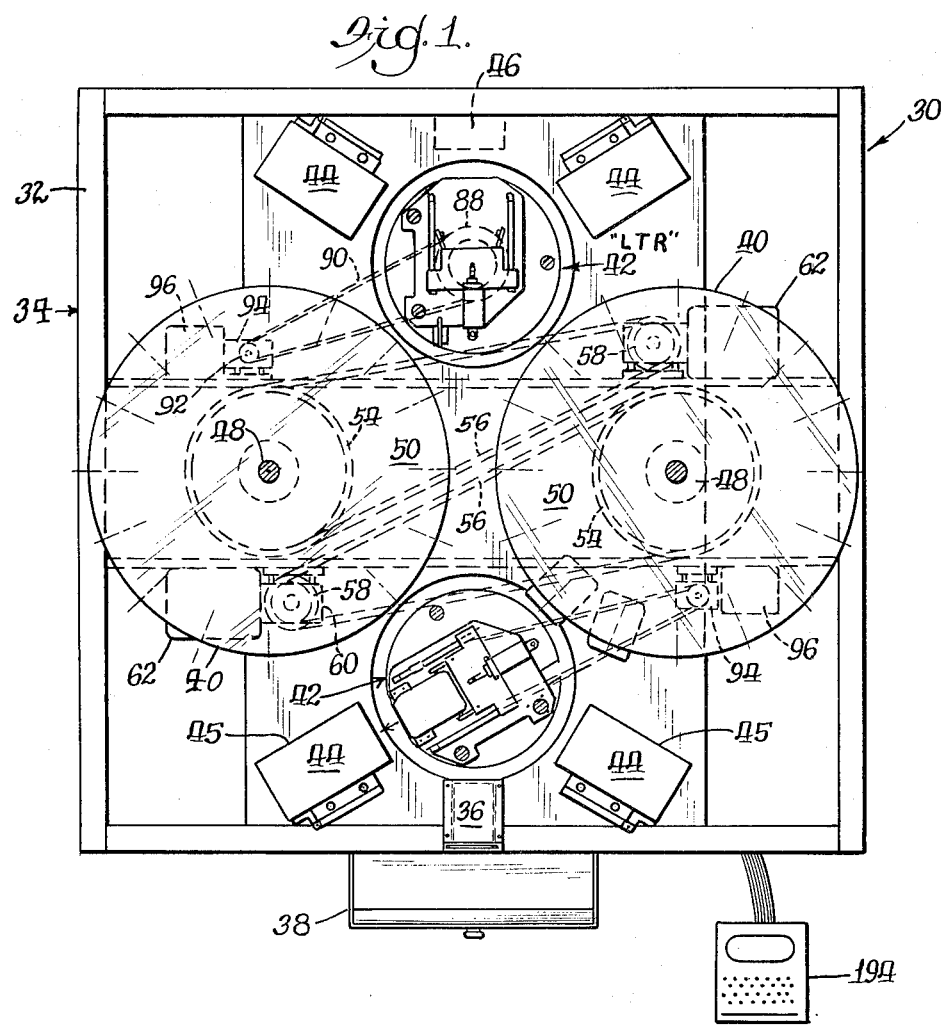
FIG. 1 is a plan view of one tape cartridge handling system according to the present invention.

Referring now to the preferred embodiment of the tape cartridge handling system 30 illustrted in FIG. 1, FIG. 3 and subsequent views, this comprises a frame 32 with a casing 34 which is for all practical purposes sealed against access except through loading chute 36 and unloading chute 38. FIG. 1 shows a system having maximum redundancy to assure continued operation even in case of major component failure. It comprises two identical cartridge storage drums 40, two "LTR" cartridge transfer mechanisms 42, and four stacks 44 of individual playback transducer machines. Each stack 44 comprises six individual playback units although any other desired number may be employed. Further, an optional fifth stack 46 may be placed at the location shown in FIG. 1, with appropriate re-sizing of the frame and casing as required to make room for it.

Figure 2:
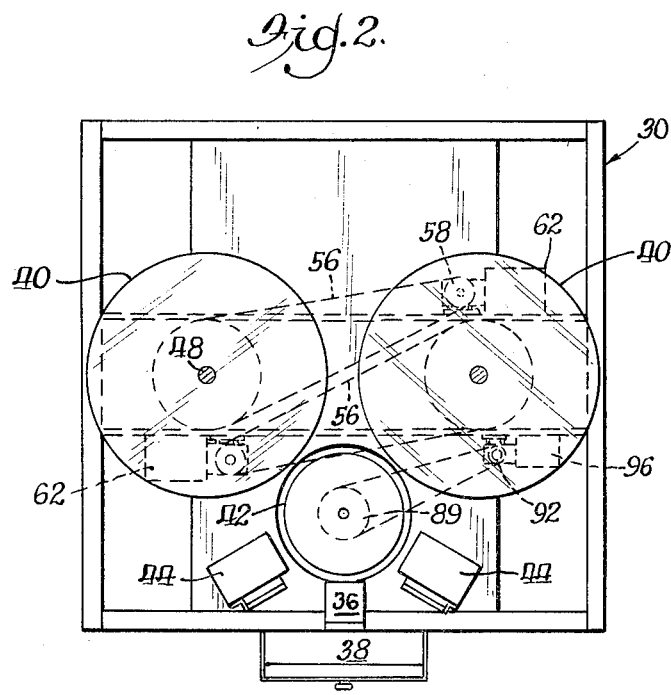
FIG. 2 is similar to FIG. 1, showing a system having fewer components, and somewhat less redundancy.

An alternate form of the invention, with somewhat less redundancy, is shown in FIG. 2. This is the same as FIG. 1 but uses only one "LTR" transfer mechanism 42 instead of two, and two stacks 44 of playback machines instead of four or five. A still further embodiment, not specifically shown, would be similar to FIG. 2 but would have only a single drum 40, a single transfer mechanism 42, and a single stack 44; this would provide a basic system, useful in small radio broadcasting operations, and such a single drum could be of reduced size having, say, 256 cartridge compartments arranged in 16 columns and 16 rows.

Returning to the embodiment shown in FIG. 1, each drum 40 has a cylindrical configuration with 512 cartridge storage compartments arranged in 16 columns about its circumference and in 32 vertically spaced rows along its axis. The drums are rotatably journaled in the frame about central shafts 48. Each has a top and bottom disc 50 and 52 respectively. Each has a pulley 54 at the bottom connected by a belt 56 to a drive pulley 58 on a reducer 60 driven by a motor 62. Thus, each drum is rotatable by its own motor 62 independent of the other drum.

The six playback transducer machines in each stack 44 may be any standard playback machines so will not be described in detail. For example, Recorder/Reproducer machines Models No. PM-110 for mono and PS-110 for stereo, manufactured by International Tapetronics Corporation, Bloomington, Illinois, may be used.

The LTR cartridge transfer mechanism 42 is generally shown in FIG. 4 separate from the rest of the system. It comprises a pivotably swingable cage or carriage 64, a vertically moveable platform 66 and a horizontally moveable cartridge holding member 68 having gripper mechanism 70.

The cage 64 comprises an upper disc 72 and a lower disc 74 held in fixed, vertically-spaced relation by vertical shafts 76, 78 and 80. It is pivotably or rotatably swingable about upper and lower pins 82 which are journaled in the frame. At least the bottom pin 84 is hollow to provide a passageway for electrical control and power cables 86 for motors, light sources, light sensors, and a gripper solenoid to be described. Each transfer mechanism 42 has a pulley 88 below the bottom disc 74, connected by a belt 90 to drive pulley 92 on gear reducer 94 driven by motor 96 which in turn in fastened to the frame. Thus, each transfer mechanism 42 is rotatable by its own motor 96 independent of the other transfer mechanism.

The platform 66 consists of a plate 98 with two cylindrical guide bushings 100 fastened to the underside. These are telescopically slidable along shafts 76 and 78 to guide the platform for smooth, precise up and down movement relative to the cage 64. Power traversing means, including a motor 102 and right angle gear head 104, are provided to move the platform. The gear head has a wide face cylindrical drive pulley 106. At the upper end of the cage, an idler pulley 108 is rotatably mounted on upper disc 72. A cable 110 has one end 112 (FIG. 9) anchored to plate 98 by a set screw 114 (FIG. 4) in the plate to drive pulley 106 about which it is wrapped two or more times to provide a friction drive connection. From the drive pulley, it is trained upwardly to the position shown in FIGS. 8 and 9 where the other end 118 is connected to the underside of the plate through a tension spring 120. The spring keeps the cable taut and frictionally wrapped about the drive pulley. Because motor 102 is reversible, actuation of it in one direction or the other moves the platform 66 up or down through a range of valid, discrete operative positions where it is aligned respectively with the rows of cartridges on the drums, with the loading and unloading chutes, and with the playback units in the stacks 44, all under the control of a microcomputer, as will be generally described.

The cartridge holding member 68 comprises a horizontal retrieve plate 122 with a pair of transverse extensions 124 having horizontal bores 126 through which slide shafts 128 extend. The slide shafts are fastened by bolts 130 and spacer tubes 132 to the top side of plate 98. An electrical motor 134 with a gear reducer 136 is mounted on the underside of the plate. A drive shaft 138 (FIG. 10) extending upwardly from the gear reducer through an opening in plate 98 is connected by means of a crank arm 140 and connecting rod 142 to the retrieve plate 122 and moveable therewith. Thus, when the motor 134 is activated, one full revolution of shaft 138 slides the retrieve plate 122 back and forth one complete cycle between the retracted and extended positions shown in FIGS. 4 and 9 respectively. Both these positions are shown in FIG. 17.

The cartridge gripper mechanism 70 comprises a pair of gripper arms 144, 146 (FIG. 20). They are almost identical. Each is L-shaped, pivoted to the retrieve plate at 147 about a pin 148, has a transverse portion 150 with the ends half lapped and recessed within a groove 152 along the front edge of the retrieve plate. An actuating post 154, with a cross pin 156 extends through longitudinal retrieve plate slot 158 through transverse slot 160 is arm 146, and is threaded into tapped hole 162 in arm 144. Each has a forwardly extending portion 164 with inwardly extending screw points 166. A solenoid 168 is supported on the retrieve plate for movement with it. The solenoid armature 170 is connected by a chain 172 to the cross pin 156 on post 154. When energized, the solenoid pulls the post backward against springs 169, 169, drawing the arms inwardly to grip a cartridge 174 between screw points 166. Cartridge-engaging bumpers 171 are slidable in bores 173 against springs 175 and are held by pins 177.

Summarizing briefly the operation of each LTR cartridge transfer mechanism 42, each is swung by a motor 96 through operative positions aligned with either drum 40, either stack 44 of playback transducing machines, or the loading and unloading chutes 36, 38. The platform 66 is vertically moveable by motor 102 to discrete operative positions in which the platform is aligned with the respective rows of storage compartments on the drum, or with individual playback units in the stacks 44, or with the loading and unloading chutes. The retrieve plate 122 is moveable by motor 134 between extended and retracted positions shown in FIG. 17. And the gripper mechanism is activated to grip a cartridge by solenoid 168.

All functions of the system are managed by a microcomputer, a standard component readily available from different manufacturers under various product designations. Many of these are well known so will be described here only generally. One particular unit which has been used for this system is the Zilog Z-80 microcomputer identified as CPU in FIG. 23, manufactured by Zilog Inc., Cupertino, California. One set of functions which it monitors and controls are the discrete operative positions of 8 mechanisms as follows:

(a) For the two drums 40, sixteen rotated positions of each drum in which the sixteen cartridge columns face one or the other of the LTR transfer mechanisms 42.

(b) For the two cages 64, five pivotally swung positions of each facing the two drums 40, the two adjacent stacks 44, and the loading and unloading chutes 36 and 38.

(c) For the two platforms 66, thirty-two vertical positions of each at the levels of the thirty-two rows of cartridges on the drums, some of these levels preferably being common to the cartridge compartments in the individual playback units 45 and to the loading and unloading chutes.

(d) For the two fetch and release mechanisms, that is, the retrieve plates 122 and cartridge gripper mechanisms 70 attached to those plates, the extended and retracted positions thereof.

The computer monitors the positions of all these mechanisms with the use of optical reflective sensors or photo LED/photo transistor pairs. Outputs from these sensors are converted to computer compatible signals through the use of external electronics as shown in the block diagram of FIG. 23. These optical position sensors for the various mechanisms will now be described.

Reflective optical sensors are shown for use in monitoring the direction of rotation, and the rotated positions, of the drum 40, and of the cages 64. Similarly, reflective optical sensors monitor the extended and retracted positions of the fetch and release mechanisms, namely the retrieve plate 122 and the gripping mechanism carried by it.

For example, referring first to the optical monitoring arrangement for one of the drums, shown in FIGS. 6, 6a, 6b, 6c, 15 and 21, a cluster 176 of four light source/light sensor pairs 176a, 176b, 176c and 176d are positioned adjacent an array of four signal tracks A, B, C and D consisting of reflective strips on the lower surface of each bottom drum disc 52. As best shown in FIG. 21, the reflective strips in tracks A, B, C and D are numbered 190a, 190b, 190c and 190d respectively.

A cross-section of a representative sensor pair 176a is shown in FIG. 6c. This comprises a light source 178, for example an LED producing infrared light, and a light-sensitive photo transistor 180. By energizing the lamps 178 through conductors 182, 184 and carefully adjusting the proximity of the cluster 176 to the signal tracks, a signal will be produced by photo transistor 180 in conductors 186, 188 as the drum rotates, and this signal will be transmitted to the computer CPU for processing, as will be described.

When one of the reflective strips 190a, 190b, 190c or 190d is opposite one of the light source/light sensor pairs, light will be reflected to the sensor providing an "ON" voltage on the conductors leading to the computer. Conversely, a non-reflective surface 192 (FIG. 15 or 21) produces an "OFF" output to the computer.

The computer determines the direction of a drum 40 each time a sensor output changes. The arrangement of reflective strips on the bottom of each drum is shown in FIG. 15, and more detailed in FIG. 21. The Tracks A, B, C and D are shown only in one quadrant in FIG. 15. Actually the same strip arrangement will be repeated exactly in the other three quadrants, with a single exception: The single strip 190d in Track D will not be repeated in the other three quadrants.

Referring to FIG. 21, Track A shows a series of reflective strips 190a separated by non-reflective areas or strips 192. Track B shows an identical series of strips, these being designated 190b. They are displaced counterclockwise from strips 190a, about half their lengths. Track C has sixteen short strips 190c, each corresponding to one of the sixteen columns of cartridge compartments on the drum. As stated, there is but a single strip 190d in the entire Track D.

The computer determines the direction of movement of the drum from Tracks A and B by noting the sequence of signals from the pairs of overlapping strips 190a and 190b. If an "ON" voltage is generated for each of strips 190a before the "ON" voltage for the overlapping, companion strip 190b, the drum is rotating clockwise as seen in FIGS. 15 and 21; conversely, the reverse order means it is rotating counterclockwise.

In other words, if the B-Track sensor is "OFF" at the instant the A-Track sensor comes "ON", rotation is clockwise as seen in FIG. 15. If the A-Track sensor is "OFF" at the instant the B-Track sensor comes "ON", rotation is counterclockwise.

As best shown in FIG. 21, each of the strips 190c in Track C overlaps adjacent strips 190a and 190b by 0.040". This means the computer can determine that one of the sixteen columns of cartridge compartments on the drum is aligned with one of the LTR units 42, within 0.040", by simultaneously sensing reflective strips in all three Tracks A, B and C.

The single strip 190d is at one of the sixteen cartridge column positions and represents the "HOME" position from which the computer can subsequently count up or down to the other columns as the drum rotates to constantly monitor the rotated position. As shown in FIG. 21, this is the one position where all four reflective strips 190a, 190b, 190c and 190d coincide, transmitting four "ON" signals simultaneously to the computer. Thus, when reflective strips are sensed in all four Tracks, A, B, C and D, the computer recognizes this as the "HOME" position.

The pivoted, or rotatably swung, position of the LTR transfer mechanism 42 may be monitored by another cluster of light source/light transistor pairs identical to cluster 176 described above. Such a cluster 176 is shown beneath the cage lower disc 74 in FIG. 4, and in FIG. 16 where it is superposed on an array of reflective strips in four concentric Tracks A, B, C and D on the bottom surface of disc 74.

Tracks A and B are counterparts of the same-lettered tracks on drum disc 52. They have a series of reflective strips 192a and 192b arranged in pairs with those in Track B offset about half a strip in the counterclockwise direction. The signals from Tracks A and B are fed into the computer which determines the direction of movement as described above for the drums.

Track C has five short strips 192c, each corresponding to one of the five discrete operative positions of the cage when swung respectively toward one or the other drum, one or the other adjacent cartridge stack, or the loading and unloading chutes. As described for the strips on the drums, strips 192c overlap adjacent strips 192a and 192b by 0.040". The computer thereby determines that the LTR transfer mechanism is in one of the above discrete operative swung positions, within 0.040", when it receives "ON" voltage signals simultaneously from reflective strips in all three Tracks A, B and C.

There is only one strip 192d in Track D. This is a counterpart of strip 190d on the drum but is somewhat longer. Because the control and power cables 86 prevent continuous rotation of the cage, strip 192d serves two functions: first, it is the "HOME" or zero position from which the computer can count up or down to determine which of the five discrete operative positions the LTR unit has reached when it receives "ON" signals simultaneously from Tracks A, B and C; second, by combining direction information inputted from Tracks A and B with an "ON" signal from strip 192d, the computer stops the respective swing motor 96 and reverses it to prevent overwinding the cables 86.

The computer recognizes any changes in the sensor outputs from Tracks A, B, C and D on LTR bottom plate 74 and determines, (1) if the mechanism has reached the reset area corresponding to strip 192d; (2) if it is in one of the five discrete operative positions; and (3) the direction of movement. These three determinations will be reviewed and summarized below in some detail.

The reset area is recognized by the computer when the D-Track sensor is "ON". The mechanism is forbidden to go into this region in order to prevent cables 86 from twisting more than 180°. If the B-Track sensor is "ON" at the instant that the D-Track sensor turns "ON", the LTR mechanism 42 has traveled too far counterclockwise (as seen in FIG. 16) and must be sent in the opposite direction. Conversely, if the B-Track sensor is "OFF" at the instant the D-Track sensor turns "ON", the mechanism 42 has traveled too far in the clockwise direction and must be sent in the opposite direction. As part of the automatic start-up procedure, the mechanism 42 may be rotated into these areas so the computer can set up its counters.

When the computer determines that the LTR transfer mechanism 42 is validly swung to one of its five discrete operative positions (when A-, B-, and C-Track sensors are simultaneously "ON"), it will then determine the following things: First, determine the direction it was moving to reach that position, stored in memory from the sequence of A-Track and B-Track signals; if the mechanism is rotating in one direction, it increments the position counter in memory, and if it is rotating in the other direction, it decrements the counter. Second, the actual position is compared to the position that the mechanism 42 is programmed to reach, this program being retained in memory; if the comparison is valid, meaning the mechanism has reached its target position, the computer turns the respective power swing motor 96 off and a one-half second software timer (not shown) is started; the purpose of this timer will be explained later. If, from the above comparison, the computer determines that the target position has not been reached, it verifies the direction that it is supposed to turn and continues to energize motor 96 to turn in that direction.

The array of tracks on the LTR mechanism 42 (FIG. 16) is such that the computer can determine the direction of turn every time a change in sensor states is read.

As described above, certain changes in states occur in Tracks A and B which are unique in clockwise and counterclockwise directions. If the B-Track sensor is "OFF" at the instant the A-Track sensor comes "ON", rotation is clockwise as seen in FIG. 16. If the A-Track sensor is "OFF" at the instant the B-Track sensor comes "ON", rotation is counterclockwise. This determination is updated constantly during swinging of the LTR unit to insure that it is turning in the proper direction.

Using the above determinations, the computer controls both LTR mechanisms 42 in the following ways. In memory it keeps an identification number which corresponds to one of the operative positions facing other components as follows:
  0=loading chute/unloading chute
  1=playback Stack I
  2=Drum I
  3=Drum II and
  4=Playback Stack II These computer position numbers are designated on FIG. 16 where it will be noted that they increase as the LTR unit 42 rotates clockwise past the sensor cluster 176, the loading and unloading chute position being the zero or starting point. Also in memory, the computer keeps a number between 0 and 4 for the target position number that the unit is programmed to reach. When the computer determines that the unit 42 needs to go to a different position, these two computer numbers will be different. The difference tells the program how far it must move the mechanism, and by determining which number is large, the computer can determine which direction the unit must swing. The computer will then swing the mechanism in that direction and update its memory as it passes through valid operative positions. Further, the computer is programmed so the rotating speed will decrease as the mechanism 42 gets closer to the desired target position. Since the A and B tracks have four strips 192a and 192b between operative positions, in the particular embodiment shown in FIG. 16, the computer can adjust the speed of motor 96 several times between adjacent operative positions if desired. Once the computer has determined that the unit 42 has reached the targeted valid operative position, a new sequence will be executed from a program originally stored in memory by terminal 194. As described above, as soon as the motor 96 is turned off, a one-half second timer is started. When the mechanism has been on a valid, operative position for one-half second continuously, the operation is considered complete, however the sensor cluster 176 continues to be monitored to insure that the mechanism 42 stays on position.

Vertical position monitoring and control for the vertically moveable platform 66 will now be described. Referring to FIGS. 4, 5, 7, 22 and 25, the vertical lift position template 196, parallel to the line of movement of the platform, is supported on a vertical strut 198 fastened between the upper and lower plates 72, 74 of the cage 64. The template 196 has four rows of slots A, B, C and D. These are generally comparable to the circular Tracks A, B, C and D on the drums and on the LTR transfer mechanisms except they are straight instead of circular and the light transmitting mediums are apertures instead of reflective strips. The position is determined using four LED/transistor pairs mounted in a bracket 200 which is bolted to the underside of plate 98. As shown in FIG. 25, LED light sources 202 and matching light sensor transistors 204 are aligned in pairs with the slots or tracks A, B, C and D. An "ON" condition is read by the computer when a slot is present in the track and an "OFF" is read between slots.

The thirty-two discrete operative positions of the platform 66, corresponding to the heights of the thirty-two rows of cartridge compartments on the drum, are sensed when the A-, B-, and C-Track sensors are all in the "ON" state. In the embodiment shown, this occurs every inch along the template and persists for 0.010".

Tracks A and B are comparable to those previously described for the drums and the LTR units. Tracks A and B comprise slots 204a and 204b. They are the same length, equally spaced, and overlap approximately one half a length. Track C has a series of slots 204c which overlap each corresponding pair of slots 204a, 204b by about 0.010". This is the position when the sensors for all three Tracks A, B and C are "ON" showing the platform 66 is in one of its valid, discrete, operative positions corresponding to one of the cartridge rows.

When the computer determines the platform is in such a valid position, it will then determine the specific level from a height counter in its memory. If the platform is going up, the computer increments the height counter in memory. If it is going down, the counter is decremented. The actual height is constantly compared with the target height recorded in the computer memory. If these are the same, the lift motor 102 is turned off and a one-half second timer is started. If they are not the same, the computer makes sure of the direction that the platform is programmed to move and continues energization of the motor 102 in the proper direction.

As shown in FIG. 22, Track D on the template 196 has two slots: an upper slot 204dh; and a lower slot 205dl. These are reset and reverse zones. Reset is recognized by the D-Track sensor being "ON". This occurs only at the ends of the template and indicates to the computer that the platform has gone too high or too low. If it is too high, the D- and B-Track sensors will be "ON" and the C- and A- sensors will be "OFF". The computer will then energize the motor 102 to send the platform down as fast as possible when this condition occurs. If the platform is too low, the D- and C-Track sensors will be "ON" and the B- and A-Track sensors will be "OFF". In that case the computer will energize the motor 102 to send the platform up as fast as possible.

The computer determines the direction of the platform every time a sensor output changes. The actual direction of movement of the platform is determined by the change in the sensor status states, utilizing the longitudinally offset spacing of the slots in Tracks A and B. If the B-track sensor is "OFF" at the instant the A-Track sensor comes "ON" the platform is moving up. If the A-Track sensor is off at the instant the B-Track sensor comes "ON", it is going down.

Using the above determinations, the computer controls the mechanism in the following ways. In memory is a number that corresponds to the actual height of the platform. Also a number that corresponds to the height that the platform is programmed to reach is kept in memory. When the computer determines that the platform needs to go to a new height, these two numbers will be different. The difference in the numbers is the distance the platform must travel. By determining which number is larger, the direction that the platform must go is known. The computer then sends the platform in that direction and updates its memory as it passes through valid, discrete operative positions signified by the simultaneous "ON" states of the A-, B-, C-Track sensors. Further, the computer is programmed in such a manner that it reduces the speed of the motor 102 as the platform approaches the desired height. When that height is reached, the motor 102 is turned "OFF" and, after one-half second, the computer executes a different program. This new program keeps the platform at the desired height within the 0.010" range indicated in FIG. 2. If the platform should drift out of that range, either higher or lower, one of the sensors, either in the A-Track or C-Track will change from "ON" to "OFF". This will immediately be sensed by the computer which will re-energize the motor 102 to restore the platform to the desired height.

Monitoring and controlling the extended and retracted positions of the retrieve plate 122 will now be described. FIG. 17 shows the retrieve plate 122 in broken lines in two positions: retracted and extended. The plate 98 has rear and front openings 206, 208. An optoreflective sensor 210 is mounted on the underside of plate 98, facing upwardly through opening 206. This is a single one of the four-track sensors shown in FIG. 6a and, as shown in FIG. 17a, comprises a single light source 178 and single phototransistor light sensor 180. The sensor 210 in the rear opening 206 is positioned to direct light upwardly to a reflective strip (not shown) on the bottom surface of the retrieve plate 122 when the latter is in the retracted position shown in FIG. 17. Similarly, a sensor 210a in front opening 208 is positioned to reflect light from that same strip when the retrieve plate is in the extended position shown in FIG. 17. The computer senses an "ON" voltage from the sensors 210 and 210a to determine the position of the retrieve plate 122 and the probable position of any cartridge carried by the gripping mechanism attached to it.

The presence of a cartridge, held by the gripping mechanism in the retracted position, on the plate 98 is verified by two light source/sensor pairs generally designated 212 and 214 in FIG. 17. The rear pair 212 is shown in cross-section in FIG. 18. A lamp 216 is positioned on a bracket 222 fastened to plate 98 by bolt 224. It directs light downwardly through rear opening 218 in plate 98. A light sensitive phototransistor 220 is supported below the cartridge 174 in plate 98. The front pair 214 may be identical with the rear pair 212. Both send a signal to the computer when light beams between both pairs 212 and 214 are interrupted to indicate the presence of a cartridge. Among other advantages, these provide positive assurance that a cartridge when gripped by the arms 144, 146 is fully retracted with the retrieve plate 122 and safely clears the front edge of the plate 98 when the cage 64 is swung.

As shown in FIG. 14, each cartridge 174 is identified by an optical bar code 224. As the cartridge is drawn into the machine from the loading chute, this bar code will be moved across a reader 226 (FIG. 17) fastened to the front portion of the platform plate 92. This sort of optical reader is conventional, being employed for example in some retail stores for reading optical bar code labels on merchandise. The reader 226 will not be described in detail except that it comprises a coaxial arrangement involving an annular light source with a central light-receiving fiber leading to a light sensor. One type which has been found useful in the present application is the "SKAN-A-MATIC" fiber optic scanner, S3010-3 Series, manufactured by Skan-A-Matic Corporation, Elbridge, New York.

The loading chute 36 comprises a receiving compartment 228 mounted on the frame. It has a horizontal floor plate 230 which is at a level corresponding to the second from the bottom of the rows of cartridges on the drums. The floor plate is of substantially the same size and shape as a tape cartridge. The compartment has sidewalls 232, 232, a backwall 234 and a vertically slidable front door 236. The dimensions are such that several cartridges 174 can be loaded manually on the floor plate 230 through the front opening 238.

As best shown in FIGS. 12, 14 and 19, there is a vertical rib 240 on the inside of the door. The rib has a bottom, angled, cam face 242. The rib registers with the capstan recesses 244 (FIG. 14) which characterize the front edges of standard NAB cartridges. The rib 240 prevents the door from dropping to its fully closed position if any one cartridge is in the compartment 228 upside-down or backward.

The backwall 234 has an opening 246 immediately above the floor plate 230. This is of just sufficient size to permit entrance of a cartridge into the machine. A gate 248 is moveable between a lower position blocking movement of a cartridge from the floor plate into the machine as shown in FIG. 19b, and an upper position permitting the cartridge to enter as shown in FIGS. 19 and 19a. The gate is pivotally associated with the door 236 by a lever 250 pivoted at 252 on one of the sidewalls 232. The front end of the lever 250 will be engaged by the bottom edge of the door when the latter is in its bottom, fully-closed position. In this case it will pivot the gate 248 upward, free of the bottom cartridge 174 on the floor plate as shown in FIG. 12. Thus, if all the cartridges in the loading chute are properly placed with their capstan recesses 244 aligned with the rib 240, the door will drop to its fully closed, bottom position moving the gate 248 upward to its open position.

An optointerrupter 256 will be operated by lever 250 to signal the computer that the door is closed and the gate is open. The optointerrupter comprises a flag 254 with an end portion 254a movable into and out of a groove in a bracket 255 having an infrared lamp 257 and an infrared light sensor 259 on opposite sides of the groove. Making and breaking of the light beam verifies that the gate 248 is open or closed.

Referring to FIG. 19d, at the level of the bottom cartridge there are two, aligned openings in opposite sidewalls. These have, respectively, an infrared lamp 258 and a light sensor 259 mounted on a circuit plate 261. A cartridge 174 on the floor plate 230 cuts the light beam. If the light beam is broken, or not, a signal will be transmitted to the computer to that effect. Thus, "ON" signals from the optointerrupter 256 and from the optical sensor pair 258, 259 will verify to the computer that a cartridge is in place and ready to be transferred into the machine.

The cartridge unloading chute 38 will now be described. This is shown in FIGS. 1, 3, 12 and 13. Cartridges are unloaded from the LTR platform plate 98 when the latter is in the bottom position, at the level of the first or bottom row of cartridges on the drums. This enables cartridges to be discharged below the loading chute floor plate 230 where they will drop through an opening 260 in the machine base into a rectangular basket 262 which is lined with foam rubber or like cushioning material. It is hinged on the frame at 264 and may be opened as shown in FIG. 3 to remove unloaded cartridges. As shown in FIG. 12a, the basket sidewalls 272 have aligned apertures 266. When the basket is closed, as shown in FIGS. 12, 12a, and 13, these apertures are aligned between a light source 268 on bracket 269, and a light sensor 270 on bracket 271. An uninterrupted light beam through the apertures 266 shows that the basket is in proper, closed position and there is room for more cartridges. An optointerrupter 273 (FIGS. 12a and 12b) verifies that the basket is closed. This is similar to 256 described above. It comprises a flag 274 on the outside of the basket sidewall 266 moveable into and out of a groove in a bracket 276 having a lamp 278 and a sensor 280 on opposite sides of the groove. Making and breaking of the light beam verifies that the basket is open or closed. This information is transmitted to the computer which will warn the operator if the basket is open, or full.

The drums 40, the two LTR transfer mechanisms 42, and the retrieve plates 122 use the reflective-type sensors to give their position information to the computer. On the other hand, the vertically moveable platform 66 and a cartridge 174 moveable on plate 92 use an LED/photo transistor pair to give their position information to the computer. Using the information from the sensors as described above, the computer determines the proper control signals for any corrections or modifications of movement and sends the control signals to the motor control circuitry. Regardless of the type of sensors employed to monitor movement, it employs the general feedback principle illustrated by the block diagram in FIG. 24.

Although FIG. 24 shows only one such feedback control loop, there are actually eight such control loops in the system (two for the drums, two for the swingable transfer mechanisms, two for the vertically moveable platforms, and two for the extendable and retractable retrieve members 122) with one common component: the computer CPU. Through the use of various multiplexing techniques, the computer is able to position all eight mechanisms simultaneously and still handle the many other functions described.

The motors which rotate the drums and swing the transfer mechanisms and elevate the platforms, namely motors 62, 96 and 102, are permanent magnet DC motors. Phase control techniques are employed by the computer to obtain the various motor speeds used in positioning. These phase control techniques also provide the capability of reversing the motors. The motors 134 which extend and retract the retrieve member 122 are universal AC motors; the computer and interface electronics allow the motor to move in either direction at a fixed speed.

The retrieve and gripping mechanisms driven by the motor 134 and the solenoid 168 have two basic operating sequences: one is a fetch sequence, to take a cartridge from some location and retract it onto plate 98; the other is a transfer sequence, to move it from the plate 98 to another location. The following is the fetch sequence:

(a) Turn off the gripper 70 by de-energizing solenoid 168, in which case the spring return within the solenoid moves the arms 144, 146 apart to their wide open position.

(b) Energize motor 134.

(c) Start three ten second timer (this will be explained later).

(d) Wait for the rear sensor 210 to send an "OFF" signal to the computer.

(e) Wait for the front sensor 210a to send an "ON" signal to the computer.

(f) In response to the "ON" signal, the computer energizes solenoid 168 causing the gripper 70 to grip the cartridge.

(g) Wait for the front sensor 210*a* to send an "OFF" signal to the computer.

(h) Wait for the rear sensor 210 to send an "ON" signal to the computer (At this stage, the cartridge, gripped by the arms 144, 146, is all the way back on the plate 98 in the retracted position shown in FIG. 17).

(i) Turn off motor 134.

(j) Wait one-half second to be sure the motor has stopped.

(k) Check to verify that the rear sensor 210 is still "ON", as verification that the motor has indeed stopped and that the sequence is completed.

Starting with the above-described condition in which a cartridge is gripped on the plate 98, as shown in the retracted position in FIG. 17, the transfer sequence is as follows:

(a) De-energize gripper 70 by deenergizing solenoid 168 (cartridge guides on the platform from here on will guide the cartridge into place).

(b) Energize motor 134.

(c) Start the three second timer (mentioned in the previous sequence).

(d) Wait for the rear sensor 210 to send an "OFF" signal to the computer.

(e) Wait for the front sensor 210*a* to send an "ON" signal to the computer.

(f) Wait for the rear sensor 210 to send an "ON" signal to the computer verifying that the grip mechanism is all the way back.

(g) De-energize motor 134.

(h) Wait one-half second to be sure that it has stopped.

(i) Check to verify that the rear sensor 210 is "ON", thereby assuring the computer that the motor has indeed stopped.

The sequence of transferring a cartridge from one location to another is now completed.

Regarding the three second timer referred to in the above fetch and transfer sequences, each sequence takes less than two seconds to perform. The three second timer is employed to detect a failure. If either the fetch or transfer sequence is not fully completed within three seconds, a failure is therefore detected by the computer which will automatically shut down that particular LTR transfer mechanism, display an alarm to the operator, and change operations to the other LTR transfer mechanism until the faulty one can be repaired. The computer will keep a running record of the steps in the above sequences. By keeping a detailed record in its memory of all the steps properly performed before failure occurred, the computer will attempt to determine the proper corrective action and execute it if possible. If the mechanism still fails, the computer will no longer use that mechanism and inform the operator of the failure. When the operator subsequently signals the computer, either through the terminal 194 or otherwise, that the fault has been repaired, the computer will again use the repaired mechanism.

The control programs for each mechanism that moves (that is, each rotatable drum, each swingable transfer mechanism, each elevatable platform, each extendable and retractable retrieve plate, etc.) are set up as sub-divisions of the main control program which is placed in the microcomputer through the terminal 194. The only time any of these control programs are executed is when a sensor output has changed. All sensors are monitored by the computer every 4.096 milliseconds and if no change has occurred since the last reading, they are ignored. If a change has occurred, the position programs are then executed. Each mechanism has a starting program. This is responsible for actually starting the movement of the motors and setting up the program memory so the positioning programs can be used. The starting programs are called for only when the computer has determined that a mechanism must move to a new position.

Each time retrieve motor 134 is started, as mentioned above, a three second timer is started. For all other operations, which takes less than five seconds to perform, a 10 second timer is started. The timer tells the computer how long each mechanism takes for its positioning task. If the full three or ten seconds should elapse, depending on the mechanism, it has failed for some reason. The movement will then be attempted for a second time, and if failure still occurs, it will be disabled and bypassed by the computer until it is repaired and a message inputted to the computer to that effect.

The one-half second timer mentioned above will now be explained. Every time a rotatable drum, swingable cage, or elevatable platform within a cage, is on a valid, discrete operative position, a one-half second timer is started. If the moveable member should go off position after the start of this timer, it is stopped and reset. Since this timer is stopped and reset every time the moveable mechanism moves off position, completion of a movement can occur only when the device is on position for a full one-half second continuously. This allows vibration or oscillation to cease, or overshooting to fully dampen and come to a complete stop before the computer monitors it to determine whether it has in fact stopped.

In operation, as many as 1024 cartridges may be stored in the two drums 40. By inputting a program into the memory associated with the microcomputer CPU through terminal 194, the computer will actuate the various motors and solenoids, etc. described and cause the LTR transfer mechanisms 42 to fetch selected cartridges from the drums, place them in playback transducers 45 as available, activate the playback transducers to play the cartridges in the programmed sequence, and return them to the drum storage compartments. To accomplish the transfer between one of the LTR units and one of the drums, the computer must energize the drum motor 62 to rotate the proper column to face the LTR unit. The computer must cause motor 96 to rotate the LTR unit to face the drum. And the computer must cause motor 102 to elevate the platform 66 to the proper row on the drum. Then it must execute the fetch sequence described above, cause the LTR unit to rotate to face the available playback unit, activate motor 102 once again to move the platform to the proper level, and execute the transfer sequence described above the place the cartridge in the playback unit. After play, this entire sequence will be reversed under computer control to replace the cartridge.

To insert a new cartridge into the system, the door 236 in the loading chute is opened, a cartridge is placed on the floor plate 230, and the door 236 is closed. At this time, through information conveyed by the optointerrupter 256 and the optical presence sensor at 258 (FIG. 19) the computer will have information that a cartridge is ready for transfer into the system. It will then perform fetch and transfer sequences to move the cartridge from the floor plate 230 into an available drum compartment, the cartridge being identified by reader 226 as it is drawn onto the platform 66.

While one main form in which the present invention may be embodied has been shown and described, it will be understood that various modifications may be made within the spirit and the scope of the invention which should be limited only by the appended claims.

The embodiments of the invention in which an exclusive property or privilege is claimed are defined as follows:

1. A tape cartridge handling system comprising:
   a frame;
   at least one cartridge storage drum, at least one stack of cartridge transducing machines, a loading chute, an unloading chute, and a cartridge transfer mechanism mounted on the frame;
   the cartridge drum having a cylindrical configuration with cartridge storage compartments arranged in columns about its circumference and in rows along its axis and being rotatably movable to discrete operative positions to move the respective columns to positions aligned with the transfer mechanism;
   power rotating means for rotatably moving the drum to its operative positions;
   the transfer mechanism including a cage and a platform supported thereon mounted for swinging movement to discrete operative positions aligned with the drum, the stack of transducing machines, the loading chute, and the unloading chute respectively;
   power swinging means for swingably moving the transfer mechanism to its operative positions;
   the platform and the drum being relatively movable parallel to the axis of the drum to discrete operative positions in which the platform is aligned with the respective rows of storage compartments on the drum;
   power traversing means for relatively moving the platform and drum parallel to the axis of the drum to the operative positions in which the platform is aligned with the respective rows on the drum;
   a cartridge holding member supported on the platform for movement between a retracted position on the platform and an extended position transversely thereof;
   power moving means for moving the holding member between its retracted and extended positions;
   power activated cartridge gripping means supported on the holding member and selectively activatable and deactivatable to grip and release a cartridge; and
   control means for monitoring movements of the various movable members and activating the various power means in a predetermined sequence to move a cartridge automatically from the loading chute to the unloading chute via the drum, transfer mechanism, and stack of transducing machines.

2. A tape cartridge handling system according to claim 1 in which the drum is rotatable about a vertical axis and the platform is vertically movable on the cage relative to the drum.

3. A tape cartridge handling system according to claim 2 in which the power rotating means includes a motor connected to rotate the drum.

4. A tape cartridge handling system according to claim 2 in which the power swinging means includes a motor connected to swing the transfer mechanism.

5. A tape cartridge handling system according to claim 2 in which the platform is guided for movement on the cage along guide rods supported on the cage, and the power traversing means includes a motor connected to move the platform along the rows of storage compartments on the drum.

6. A tape cartridge handling system according to claim 5 in which the motor is carried on the cage and swingable therewith, and the motor is connected to the platform by a cable trained between pulleys at opposite ends of the cage.

7. A tape cartridge handling system according to claim 2 in which the power activated cartridge gripping means includes a pair of transversely movable gripper arms positioned to engage opposite edges of a cartridge slidably supported on said platform, and power means effective when activated to enable the arms to grip a cartridge and move with the holding member, the power means further being effective when deactivated to enable the arms to release a cartridge from the holding member.

8. A tape cartridge handling system according to claim 7 in which the gripper arms are levers pivotally mounted on the holding member and urged apart to a released position by spring means, and the power means comprises solenoid means connected to the levers and effective when activated to move the levers together to gripping position against the bias of the spring means.

9. A tape cartridge handling system according to claim 2 in which the power moving means includes a motor supported on the platform and connected to the holding member by crank and connecting rod means enabling movement of said motor in one direction to move said holding member between extended and retracted positions.

10. A tape cartridge handling system according to claim 2 in which an optical reader is mounted on the platform along the line of movement of a cartridge in position to sense optical identification markings on the cartridge.

11. A tape cartridge handling system according to claim 2 in which the loading chute comprises a receiving compartment mounted on the frame and having a horizontal floor plate of substantially the same shape and size as a tape cartridge, the compartment having sidewalls, a back wall, and a vertically slidable front door, the back wall having an opening immediately above the floor plate of sufficient size to permit entrance of a cartridge from the floor plate, a gate at the inner end of the floor plate substantially flush with the back wall and preventing inward movement of the cartridge through the opening, and means interconnecting the gate and front door causing the gate to open in response to downward movement of the door to fully closed position to permit entrance of a cartridge through the opening.

12. A tape cartridge handling system according to claim 11 having a vertical rib on the inside of the compartment registering with capstan recesses in the front edges of standard tape cartridges, thereby preventing the door from closing unless all cartridges in the compartment are stacked right side up and in the same front-to-back relation.

13. A tape cartridge handling system according to claim 12 in which said vertical rib is located on the inside of the door.

14. A tape cartridge handling system according to claim 12 in which opposite sidewalls have aligned apertures with a light source and light sensor respectively therein at the level of a cartridge on the floor plate, and means for generating a signal responsive to blockage of a light beam between the light source and light sensor to verify presence of a cartridge on the floor plate.

15. A tape cartridge handling system according to claim 11 having means for concurrently sensing the fully closed position of the door and the fully opened position of the gate and generating a signal responsive thereto to verify that the door is closed and the gate is opened.

16. A tape cartridge handling system according to both claims 14 or 15 in which the control means is responsive to concurrence of both verifying signals to enable said power moving means to move a cartridge through said opening when said power moving means is activated in said predetermined sequence.

17. A tape cartridge handling system according to claim 2 in which said unloading chute comprises a basket with an upper opening to a discharge compartment therein for storing discharged cartridges, the basket being supported on the frame for movement between an inner position in which the opening is below the cartridge holding member when in extended position, and an outer position in which the opening is accessible to an operator to retrieve cartridges from said discharge compartment.

18. A tape cartridge handling system according to claim 17 in which said basket has aligned apertures in upper portions of opposite sidewalls, and a light source and light sensor on opposite sides of the basket aligned with the apertures when the basket is in its inner position, and said control means includes means for sensing a light beamed from said light source to said light sensor through said apertures.

19. A tape cartridge handling system according to claim 1 in which said control means includes:
   light source means and light sensor means mounted on one of two adjacent relatively movable members;
   signal track means on another of said adjacent relatively movable members comprising a plurality of light transmitting means between the light source means and light sensor means, effective to activate the light sensor means in response to relative movement of the members; and
   means responsive to activation of said light sensor means to determine the relative positions and direction of movement of said members.

20. A tape cartridge handling system according to claim 19 in which said light-transmitting means comprises light-reflecting surfaces on the other of said members.

21. A tape cartridge handling system according to claim 19 in which said light-transmitting means comprises openings in the other of said members.

22. A tape cartridge handling system according to claim 1 including:
   a plurality of pairs of light sources and light sensors mounted on said frame adjacent a disc rotatable with said drum;
   said disc having a plurality of concentric signal tracks, one for each light source and sensor pair;
   each track including a plurality of light transmitting means effective to transmit light from one of said light sources to the corresponding light sensor to thereby activate said light sensor and;
   said control means including means responsive to activation of said light sensors to generate signals to determine that said drum is rotatably moved to one of its said discrete operative positions.

23. A tape cartridge handling system according to claim 22 in which:
   three of said tracks transmit light simultaneously from the respective light sources to the corresponding light sensors when the drum is rotated to each of its discrete operative positions.

24. A tape cartridge handling system according to claim 23 in which a fourth track has a single light-transmitting means coinciding with one of the discrete operative positions of the drum to transmit light from the respective light source to the corresponding light sensor only when the drum is rotated to a home or zero position.

25. A tape cartridge handling system according to claim 22 in which the light-transmitting means in two of said tracks are in pairs offset along the line of movement enabling direction of movement of the drum to be determined by sensing the order in which light is transmitted by the pairs of light-transmitting means.

26. A tape cartridge handling system according to claim 22 in which said power rotating means for rotatably moving the drum includes variable speed motor means and said control means includes means for automatically varying the speed of said motor means to rotatably move said drum at a speed generally proportional to the distance between its actual position and its destination position.

27. A tape cartridge handling system according to claim 1 including:
   one control component comprising a plurality of pairs of light sources and light sensors, and another control component comprising a template, one of said control components being supported on said cage and the other being supported on said platform for movement relative to one another;
   said template having a plurality of parallel signal tracks, one for each light source and sensor pair;
   each track including a plurality of light transmitting means effective to transmit light from one of said light sources to the corresponding paired light sensor to thereby activate said light sensor; and
   said control means including means responsive to activation of said light sensors to generate signals to determine relative movement between said platform and drum to one of said discrete operative positions of the platform relative to the respective rows of storage compartments on the drum.

28. A tape cartridge handling system according to claim 27 in which three of said tracks transmit light simultaneously through the respective light transmitting means to the corresponding light sensors only when the platform is in to each of its discrete operative positions.

29. A tape cartridge handling system according to claim 28 in which a fourth track has a single light transmitting means at opposite ends of the template enabling a corresponding light source and light sensor pair to sense positions of the platform beyond the range of said discrete operative positions.

30. A tape cartridge handling system according to claim 29 in which the power traversing means includes a reversible motor and said control means includes means for automatically reversing said motor to return said platform to its range of discrete operative positions in response to signals generated by the fourth light source and light sensor pair.

31. A tape cartridge handling system according to claim 27 in which the light transmitting means in two of said tracks are in pairs offset along the line of movement enabling direction of movement between the platform and cage to be determined by sensing the order in which light is transmitted by the pairs of light transmitting means.

32. A tape cartridge handling system according to claim 1 including:
    a plurality of pairs of light sources and light sensors mounted on said frame adjacent a disc mounted for swinging movement with said transfer mechanism;
    said disc having a plurality of concentric signal tracks, one for each light source and sensor pair;
    each track including a plurality of light-transmitting means effective to transmit light from one of said light sources to the corresponding light sensor to thereby activate said light sensor;
    said control means including means responsive to activation of said light sensors to generate signals to determine that said transfer mechanism is swung to one of its said discrete operative positions.

33. A tape cartridge handling system according to claim 32 in which three of said tracks transmit light simultaneously from the respective light sources to the corresponding light sensors when the transfer mechanism is swung to each of its discrete operative positions.

34. A tape cartridge handling system according to claim 33 in which a fourth track has a single light-transmitting means between two of the discrete operative positions to identify neutral or reversing position of said transfer mechanism.

35. A tape cartridge handling system according to claim 34 in which the power swinging means includes a reversible motor and said control means includes means for automatically reversing said motor to reverse the direction of swinging movement of the transfer means in response to signals transmitted by said single light-transmitting means in said fourth track.

36. A tape cartridge handling system according to claim 32 in which the light-transmitting means in two of said tracks are in pairs offset along the line of movement enabling direction of movement of the transfer mechanism to be determined by sensing the order in which light is transmitted by the pairs of light-transmitting means.

37. A tape cartridge handling system according to claim 1 including optical means for verifying that said cartridge holding member is in its retracted position and other optical means for verifying that it is in its extended position.

38. A tape cartridge handling system according to claim 37 in which each of said optical means is a light source and light sensor on said platform and a light-transmitting strip on said cartridge holding member.

39. A tape cartridge handling system according to claim 38 including optical means for verifying the presence of a cartridge held on said holding member in both its retracted and extended positions.

* * * * *

UNITED STATES PATENT AND TRADEMARK OFFICE
CERTIFICATE OF CORRECTION

PATENT NO. : 4,271,440

DATED : June 2, 1981

INVENTOR(S) : John P. Jenkins et al

It is certified that error appears in the above—identified patent and that said Letters Patent is hereby corrected as shown below:

Column 1, line 50, "10,000" should be -- $10,000 --

Column 2, line 46, "-or" should be -- 15 or --

Column 3, line 17, "receiprocating" should be -- reciprocating --

Column 12, line 39, "224" should be -- 223 --

This certificate supersedes Certificate of Correction issued September 1, 1981.

Signed and Sealed this

Tenth Day of November 1981

[SEAL]

Attest:

Attesting Officer

GERALD J. MOSSINGHOFF

Commissioner of Patents and Trademarks